(12) United States Patent
Nishikori et al.

(10) Patent No.: US 12,623,433 B2
(45) Date of Patent: May 12, 2026

(54) METAL MEMBER, METAL-RESIN JOINED BODY, AND METHOD FOR MANUFACTURING SAME

(71) Applicant: NIPPON LIGHT METAL COMPANY, LTD., Tokyo (JP)

(72) Inventors: Yusuke Nishikori, Shizuoka (JP); Masanori Endo, Shizuoka (JP); Hiroki Ikeda, Shizuoka (JP); Yuta Endo, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 99 days.

(21) Appl. No.: 18/690,141

(22) PCT Filed: Oct. 7, 2022

(86) PCT No.: PCT/JP2022/037710
§ 371 (c)(1),
(2) Date: Mar. 7, 2024

(87) PCT Pub. No.: WO2023/063271
PCT Pub. Date: Apr. 20, 2023

(65) Prior Publication Data
US 2024/0383224 A1 Nov. 21, 2024

(30) Foreign Application Priority Data
Oct. 15, 2021 (JP) ................................. 2021-169734

(51) Int. Cl.
B32B 3/30 (2006.01)
B29C 45/14 (2006.01)
(Continued)

(52) U.S. Cl.
CPC .......... B32B 3/30 (2013.01); B29C 45/14311 (2013.01); B32B 15/082 (2013.01);
(Continued)

(58) Field of Classification Search
None
See application file for complete search history.

(56) References Cited

U.S. PATENT DOCUMENTS

2005/0042456 A1* 2/2005 Krause .............. B29C 66/30321
156/60
2011/0008644 A1* 1/2011 Naritomi ................. C23C 22/07
216/37
(Continued)

FOREIGN PATENT DOCUMENTS

JP 4020957 B2 12/2007
JP 2014-065288 A 4/2014
(Continued)

OTHER PUBLICATIONS

International Search Report (ISR) dated Dec. 27, 2022 filed in PCT/JP2022/037710.

*Primary Examiner* — Seth Dumbris
(74) *Attorney, Agent, or Firm* — RANKIN, HILL & CLARK LLP

(57) ABSTRACT

Provided is a metal-resin joined body having a high joint strength and sufficient airtightness and a metal member for obtaining the same. The metal member includes a metal base material made of a metal and a marking pattern having an uneven part formed on a surface of the metal base material, in which the marking pattern is one continuous straight line or curved line, a plurality of the marking patterns is formed to be adjacent to each other and run parallel, and, in a direction orthogonal to a running direction of the plurality of marking patterns, a maximum height roughness Rz of unevenness of the uneven parts and an average interval Rsm of the unevenness by the uneven parts have a relationship of $45 \le (180/\pi) \times \arctan(Rz/(Rsm/2)) \le 75$, and a metal-resin
(Continued)

$$x = 1/2Rsm \qquad y = Rz$$

$\theta$

1 joined body includes a resin molded body formed on a surface of this metal member.

14 Claims, 14 Drawing Sheets

(51) Int. Cl.

| | | |
|---|---|---|
| *B32B 15/082* | (2006.01) | |
| *B32B 15/18* | (2006.01) | |
| *B32B 27/30* | (2006.01) | |
| *B29K 77/00* | (2006.01) | |
| *B29K 81/00* | (2006.01) | |
| *B29K 705/02* | (2006.01) | |
| *B29K 705/08* | (2006.01) | |

(52) U.S. Cl.
CPC ............ *B32B 15/18* (2013.01); *B32B 27/302* (2013.01); *B29C 2045/14868* (2013.01); *B29K 2077/10* (2013.01); *B29K 2081/04* (2013.01); *B29K 2705/02* (2013.01); *B29K 2705/08* (2013.01)

(56) References Cited

U.S. PATENT DOCUMENTS

| | | | |
|---|---|---|---|
| 2014/0234631 A1 | 8/2014 | Iino et al. | |
| 2015/0217545 A1 | 8/2015 | Endo et al. | |
| 2015/0224742 A1* | 8/2015 | Inoue | B29C 45/14311 |
| | | | 428/458 |
| 2016/0221301 A1* | 8/2016 | Okumura | B32B 7/04 |

FOREIGN PATENT DOCUMENTS

| | | | |
|---|---|---|---|
| JP | 5714193 | B1 | 5/2015 |
| JP | 5816763 | B1 | 11/2015 |
| JP | 6004046 | B2 | 10/2016 |
| JP | 6017675 | B2 | 11/2016 |
| JP | 6387301 | B2 | 9/2018 |
| JP | 2018192480 | A | 12/2018 |
| JP | 2021091166 | A | 6/2021 |

* cited by examiner

11

20mm

2mm

2mm

8' 8

55mm

METAL MEMBER, METAL-RESIN JOINED BODY, AND METHOD FOR MANUFACTURING SAME

TECHNICAL FIELD

This invention relates to a metal member including a specific joint surface, a joined body of the metal member and a resin molded body, and a method for manufacturing the same.

BACKGROUND ART

Recently, in the field of a variety of sensor parts of automobiles, home appliance parts, industrial equipment parts and the like, metal-resin joined bodies obtained by integrally joining a metal material such as a copper base material composed of copper or a copper alloy having extremely high heat dissipation properties or conductivity or an aluminum base material composed of aluminum or an aluminum alloy having high heat dissipation properties and being lightweight compared with other metals and a resin molded body having high insulation performance and being lightweight and inexpensive have been in wide use, and the use thereof is expanding.

In addition, conventionally, as an industrially suitable method for manufacturing such a metal-resin joined body obtained by integrally joining a metal material and a resin molded body, which are dissimilar materials, together, a method in which a metal material is inserted into a mold for injection molding, a molten thermoplastic resin is injected toward the surface of this inserted metal material and the metal material and a resin molded body are joined together at the same time as the molding of the resin molded body by the injection molding of the thermoplastic resin has been developed, and several methods for further improving joint strength at a lower cost have been proposed.

For example, according to the present inventors, techniques in which an oxygen-containing film containing oxygen is formed on the surface of a metal base material by performing a specific treatment on the surface of the metal base material and a resin molded body is joined through this formed oxygen-containing film have been proposed (for example, Patent Literatures 1 to 3). These techniques are methods in which there is little risk of the corrosion of a metal part or a device or the contamination of the ambient environment, which is a problem of previously proposed surface treatment techniques, and a certain joint strength or airtightness can be obtained. However, in a case where a wet-type treatment for forming a hydrated oxide film or a zinc-containing film is performed to form an oxygen-containing film, since no macro uneven parts are formed, the joint strength of the resin joined body is not sufficient, and there is thus a room for additional improvement in the treatment method. In contrast, in a case where laser light is used in the methods of Patent Literatures 1 to 3, there is an advantage in that a macro uneven part can be formed, but the treatment is performed under a condition where the irradiation interval (pit width) is equal to or smaller than the intrinsic spot diameter (beam diameter) of a laser oscillator. In this case, a predetermined macro uneven part is not formed, consequently, a decrease in the joint strength is caused, there are cases where it becomes difficult to guarantee airtightness, and there is thus a room for additional improvement thereof.

As a method for forming a metal-resin joined body, several techniques have been proposed as described above in which the surface of a metal material is treated with laser light.

For example, Patent Literature 4 describes that a metal/resin composite structure is made to include one or more straight parts having surface roughness for which the load length ratio (Rmr) of a roughness profile with a cut level of 20% and an evaluation length of 4 mm is 30% or less when surface roughness is measured according to JIS B 0601 at a total of six straight parts that are three arbitrary straight parts in a parallel relationship on the surface of a metal member and three arbitrary straight parts orthogonal to the above-described three straight parts. That is, it is described that an uneven shape having sharp edges is formed on the surface of the metal member, whereby not only does the joint strength become high, but airtightness or watertightness also becomes excellent.

Patent Literature 5 describes that a joint part having a plurality of groove parts is formed on the metal surface during laser scanning processing in the interface where a dissimilar material and a metal material have been joined together and, in a cross-sectional view of this joint part cut in a direction perpendicular to the groove parts, when the groove width in the groove part is indicated by W, the groove depth is indicated by H, the area of the groove parts that are formed during the laser scanning processing is indicated by A, and the areas of projection parts made of burrs that are formed on both side surfaces of the groove parts during the laser scanning processing are indicated by B and C, the ratio of these areas is made to be within a predetermined range. That is, regarding pores that are formed in a metal molded body, it is described that, in a case where the groove widths from the surface of the metal molded body remain almost the same in the depth direction from the surface of the metal molded body, it is possible to satisfy airtightness. In addition, it is described that the engraving amount and the engraved mass parts during the laser scanning processing contribute to improvement in adhesion as the projection parts (burrs) in the peripheries of the groove parts.

Patent Literature 6 discloses a laser processing condition for forming a joint part that is intended to join a resin to a metal surface by a step of performing laser scanning on the metal surface in one scanning direction and a step of performing laser scanning in a scanning direction that crosses the above-described scanning direction. This makes, suitably, a part of the joint part to form a "bridge shape" in which projection parts connect together to form an arch shape and a hole is opened in the lower part or makes projection parts "overhang" to form a mushroom shape or a cedar tree shape while providing an uneven shape to the joint part, whereby an anchoring effect with a dissimilar material in the joint part can be enhanced.

CITATION LIST

Patent Literature

Patent Literature 1
    Japanese Patent No. 6004046
Patent Literature 2
    Japanese Patent No. 6017675
Patent Literature 3
    Japanese Patent No. 6387301
Patent Literature 4
    Japanese Patent No. 5714193

Patent Literature 5

Japanese Patent No. 5816763

Patent Literature 6

Japanese Patent No. 4020957

SUMMARY OF INVENTION

Technical Problem

Attention is paid to the sharpness of the uneven shape of the surface of the metal member in Patent Literature 4, and attention is paid to the shapes of pores and burrs that are formed in the metal material in Patent Literature 5, but there is a demand for additional approaches to secure airtightness in both cases. In addition, in Patent Literature 6, since there is a need to perform laser scanning in two crossing directions at all times, there is a room for improvement regarding the fact that the processing times takes too long, and, additionally, since there is a laser unirradiated part (untreated part) in the lower part of the "bridge shape," which is considered as a suitable shape, there is a concern that the joint strength and the airtightness may decrease.

An objective of the present invention is to provide a metal-resin molded body having a high joint strength and capable of guaranteeing sufficient airtightness, a metal member for obtaining the same and a method for manufacturing the metal-resin molded body and the metal member.

Solution to Problem

That is, the gist of the present invention is as described below.

[1] A metal member including a metal base material made of a metal and a marking pattern having an uneven part formed on a surface of the metal base material, wherein the marking pattern is one continuous straight line or curved line, a plurality of the marking patterns is formed to be adjacent to each other and run parallel, and, in a direction orthogonal to a running direction of the plurality of marking patterns, a maximum height roughness Rz of unevenness of the uneven parts and an average interval Rsm of the unevenness by the uneven parts have a relationship of $45 \leq (180/\pi) \times \arctan(Rz/(Rsm/2)) \leq 75$.

[2] The metal member according to [1], wherein, in the direction orthogonal to the running direction of the plurality of marking patterns, an arithmetic average roughness Ra of the uneven parts and the average interval Rsm of the unevenness by the uneven parts have a relationship of $2.5 \leq Rsm/Ra \leq 9.5$.

[3] The metal member according to [1] or [2], wherein, on the surface of the metal base material, the uneven part is formed that is made up of a recess part that is formed in a recess shape in a depth direction from the surface in a central part of the marking pattern and a projection part that is formed in a projection shape in a height direction from the surface at a peripheral part of the marking pattern, and on the surface of the metal base material, in a region that is sandwiched by the marking patterns adjacent to each other, the projection parts that are included in the marking patterns adjacent to each other, respectively, are formed to be in contact with each other and integrated together, and an untreated part where the metal base material is exposed is not formed.

[4] The metal member according to any one of [1] to [3], wherein the metal is aluminum, copper, iron or an alloy containing each of these metals.

[5] A metal-resin joined body including the metal member according to any one of [1] to [4] and a resin molded body formed on a surface of the metal member, wherein the metal member and the resin molded body are joined together in a state where a resin has entered the uneven parts of the marking patterns.

[6] The metal-resin joined body according to [5], wherein the resin molded body contains a thermoplastic resin or a thermosetting resin.

[7] A method for manufacturing a metal member, including an irradiation step of irradiating a surface of a metal base material made of a metal with laser light to form a marking pattern having an uneven part that continues along an irradiation trajectory of the laser light on the surface of the metal base material, to manufacture a metal member having a plurality of the marking patterns formed on the surface of the metal base material, wherein the marking pattern is one continuous straight line or curved line, in the irradiation step, the plurality of marking patterns that is adjacent to each other and runs parallel is formed by irradiation of adjacent portions with the laser light, and, in a direction orthogonal to the irradiation trajectories of the plurality of marking patterns, a maximum height roughness Rz of unevenness of the uneven parts and an average interval Rsm of the unevenness by the uneven parts have a relationship of $45 \leq (180/\pi) \times \arctan(Rz/(Rsm/2)) \leq 75$.

[8] The method for manufacturing a metal member according to [7], wherein, in a direction orthogonal to a running direction of the plurality of marking patterns, an arithmetic average roughness Ra of the uneven parts and the average interval Rsm of the unevenness by the uneven parts have a relationship of $2.5 \leq Rsm/Ra \leq 9.5$.

[9] The method for manufacturing a metal member according to [7] or [8], wherein, on the surface of the metal base material, the uneven part is formed that is made up of a recess part that is formed by dispersion of the metal in a place irradiated with the laser light outward from an irradiation central part of the laser light and a projection part that is formed by accumulation of the metal that has dispersed from the recess part in a periphery of the recess part, and on the surface of the metal base material, in a region that is sandwiched by the marking patterns adjacent to each other, the projection parts that are included in the marking patterns adjacent to each other, respectively, are formed to be in contact with each other and integrated together, and an untreated part where the metal base material that is to be irradiated with the laser light is exposed is not formed.

[10] The method for manufacturing a metal member according to any one of [7] to [9], wherein the metal is aluminum, copper, iron or an alloy containing each of these metals.

[11] A method for manufacturing a metal-resin joined body, including a resin molding step of forming a resin molded body on a surface of a metal member obtained by the manufacturing method according to any one of [7] to [10], to manufacture a metal-resin joined body having the metal base material and the resin molded body joined together, wherein, in the resin molding step, the metal member and the resin molded body are joined together in a state where a resin has entered the uneven parts of the marking patterns.

[12] The method for manufacturing a metal-resin joined body according to [11], wherein, in the resin molding step, molding on the metal member is performed by using a resin composition containing a thermoplastic resin or a thermo-setting resin.

Advantageous Effects of Invention

The metal member and the metal-resin joined body of the present invention are capable of improving the joint strength and airtightness between a metal member and a resin molded body.

DESCRIPTION OF EMBODIMENTS

Figure 1:
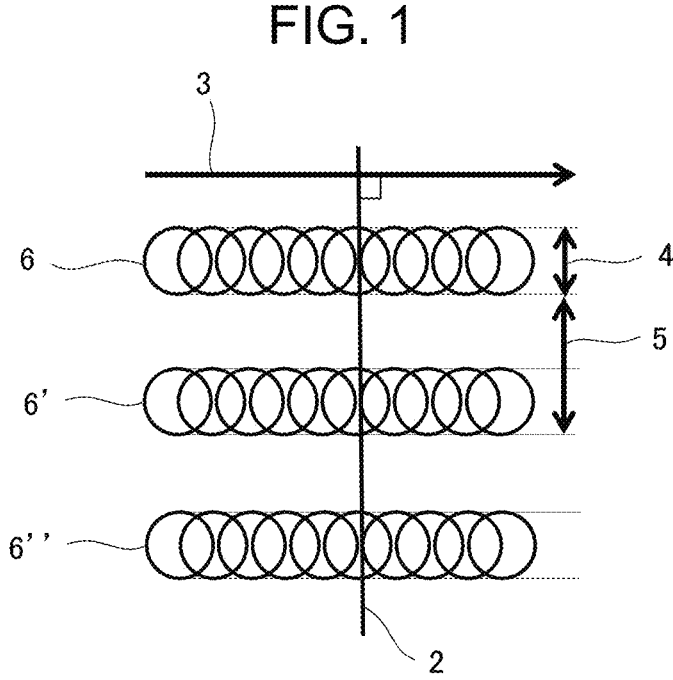
FIG. 1 is a pattern diagram showing the relationship between the beam diameter of laser light and irradiation intervals.

Hereinafter, a metal member and a metal-resin joined body of the present invention will be described in detail together with methods for manufacturing the same. Configuration elements of the present invention to be described below can be partially or fully combined as appropriate.

[1. Metal Member and Metal-Resin Joined Body]

The metal member of the present invention includes a metal base material made of a metal and a marking pattern having an uneven part formed on a surface of the metal base material; and this metal member can be used with an object to be joined joined to a surface thereof. In addition, the metal-resin joined body of the present invention includes a metal member and a resin molded body on a surface of the metal member.

[1-1. Metal Member]

<Metal Base Material>

First, regarding the metal base material made of a metal that is used in the metal member of the present invention, the material thereof is not limited and can be determined based on the use of a metal-resin joined body that is formed using this metal base material and a variety of physical properties required for the use such as strength, corrosion resistance and workability, and a copper base material made of copper or a copper alloy, an iron base material made of iron or an iron alloy, an aluminum base material made of aluminum or an aluminum alloy or the like can be used. In addition, processed materials appropriately processed into a desired shape, furthermore, combined materials that are obtained by appropriately combining these processed materials and the like can also be exemplified. In addition, while also varying with the use where the metal member is used, it is normal to use a metal base material having a thickness of approximately 0.3 mm to 10 mm. Normally, an oxide film is formed on the surface of the metal base material. The oxide film may be a natural oxide film that is naturally formed in the atmosphere or an anodic oxide film that is formed by anodization. In addition, the oxide film may also be a rolled oxide film that is formed by hot rolling.

<Object to be Joined>

The object to be joined with the metal member is not particularly limited as long as the object to be joined is a material that can be joined with the metal member. As the object to be joined, a material that can be joined at a temperature lower than the melting point of the metal base material that forms the metal member is preferably used. Such an object to be joined is suitably a resin molded body made of a resin material. The resin molded body will be described below.

<Joint Surface>

The metal member has a joint surface to join the object to be joined to the metal member. In the formation of this joint surface, the joint surface may be formed on a necessary part depending on the use where the metal-resin joined body is used or the like, and the necessary part may be only a part of one surface of the metal base material, may be all of one surface or may be a part or all of both surfaces. In addition, the shape, size, disposition and the like of the joint surface are also not particularly limited. What has been described above is also true in the case of combined materials and the like. In the present disclosure, "joint surface" refers to a region where the joining of the metal base material and a resin is planned and a predetermined treatment has been performed on the surface of the metal base material for the joint with the resin. In contrast, a region where the metal base material and a resin have been joined together will be distinctively referred to as "joint part."

<Marking Pattern>

The marking pattern is continuously formed on the surface of the metal base material along the irradiation trajectory of laser light, and the principle of forming the marking pattern in an irradiation step is generally as described below. That is, when the metal base material is irradiated with a laser, the metal base material melts, disperses and evaporates due to energy from the laser irradiation, the metal is dispersed and evaporated outward from the irradiation central part, and the metal base material is perforated, whereby a space acts as the base of a recess part, and parts on both sides of the recess part not irradiated with the laser act as the bases of projection parts. At the same time, the molten metal part is partially or fully oxidized to form a metal oxide, and this metal oxide disperses, accumulates and solidifies in the periphery of the irradiated part, which becomes the recess part, whereby the projection parts are formed. In a region that is sandwiched by the marking patterns, it is preferable that the projection parts that are included in the marking patterns adjacent to each other, respectively, are formed to be in contact with each other and integrated together, and, on the surface of the metal member, it is preferable that a metal base material-exposed part (untreated part), which corresponds to a laser unirradiated part to be described below, is not formed. An accumulated substance composed of the metal oxide covers the recess part and the projection parts and is formed in a film shape. A metal molten layer that forms the uneven shape of the uneven part is formed of the accumulated substance composed of the metal oxide formed on the surface of the metal base material as described above. That is, the marking pattern is formed by the continuous presence of the accumulated substance (metal molten layer) composed of the metal oxide having such an uneven part (uneven shape) in the irradiation trajectory of the laser light along the irradiation trajectory of the laser light. In a case where the laser irradiation is performed along irradiation trajectories adjacent to each other, the marking pattern has a repeated structure in which recess parts and projection parts are adjacent to each other and repeated.

As a method for confirming the formation state of such a metal molten layer in the marking pattern, the metal molten layer can be confirmed distinctively from the metal base material that does not melt by melting the metal molten layer with, for example, an alkali etching treatment. In addition, the metal oxide is at least somewhat partially ionic, and, on the new surface of the metal oxide, a metal ion ($Al^{3+}$) and an oxide ion ($O^{2-}$) are present. Due to electrostatic neutralization, the metal oxide reacts with moisture in the air, whereby the metal oxide present on the surface of the metal molten layer turns into a hydroxyl group, and the surface of the metal molten layer is covered with the hydroxyl group. A hydroxyl group-containing film containing the hydroxyl group is formed on the outermost layer of the metal molten layer in the marking pattern.

In a case where there is a laser unirradiated part (untreated part) that is not irradiated with a laser on the metal member as described above, no marking patterns are present in the laser unirradiated part, and the metal molten layer that forms the uneven part is also not present. Normally, an oxide film is formed on the laser unirradiated part. Since the laser unirradiated part has no uneven parts and is thus normally flat, improvement in the joint strength by mechanical joint attributed to the uneven part cannot be expected when a resin or the like is joined to that part, and improvement in the airtightness also cannot be expected since the laser unirradiated part is flat and no voids are thus generated. Therefore, in a case where the laser unirradiated part remains on the joint surface and no marking patterns are formed on the entire joint surface, since there are no metal molten layers that form an uneven part, the joint strength of the metal-resin joined body decreases, and there is a concern that fracture in the joint interface may be caused. Therefore, in the present invention, it is preferable that the making pattern is formed on the entire joint surface in the metal member. Since there are no hydroxyl group-containing films, which have been described above, in the laser unirradiated part, the exhibition of an interaction by a chemical joint attributed to the hydroxyl group also cannot be expected.

As described above, the marking pattern has a structure including the recess part that is generated by the irradiation with laser light and the perforation of the metal base material and the projection parts made of the accumulated substance of the metal oxide generated by the irradiation with laser light. Such an uneven part can be confirmed by observing the surface or cross section of the metal member using, for example, a scanning electron microscope (SEM). The structure of the uneven part will be described below.

In the present invention, the marking pattern is made to be one continuous line. That is, it is preferable that the marking pattern is neither discontinuous nor cut in the middle and is not two or more crossing lines. The marking pattern may be a straight line, may be a curved line or may be a combination of a straight line and a curved line. A plurality of such marking patterns is formed to be adjacent to each other and run parallel and provides predetermined uneven parts, whereby the joint surface of the metal member according to the present invention is formed. That is, in a direction orthogonal to the running direction of the plurality of marking patterns, a maximum height roughness Rz of unevenness of the uneven parts and an average interval Rsm of the unevenness by the uneven parts satisfy the following relational formula (1). Specifically, in the irradiation step of irradiating a surface of a metal base material with laser light to form a marking pattern having an uneven part that continues along the irradiation trajectory of the laser light, when a plurality of marking patterns that is adjacent to each other and runs parallel is formed by irradiation of adjacent portions with the laser light, the maximum height roughness Rz of unevenness of the uneven parts and the average interval Rsm of the unevenness by the uneven parts satisfy the relational formula (1) in the direction orthogonal to the irradiation trajectories of those marking patterns.

$$45 \leq (180/\pi) \times \arctan\left(Rz/(Rsm/2)\right) \leq 75 \tag{1}$$

Here, the maximum height roughness Rz of unevenness and the average interval Rsm of unevenness are both surface roughness that is measured according to JIS B 0601-2001, Rz represents the height (maximum height) from the lowest trough to the maximum crest per standard length, and Rsm represents the average value (the average length of roughness profile elements) of the intervals of the crest-trough cycle obtained from the intersections where the roughness profile intersects with the average point. In the present invention, attention is paid to recess parts that are formed in a direction 2 orthogonal to the irradiation trajectories of marking patterns (a direction orthogonal to a scanning direction 3) when two or more marking patterns have been formed by performing irradiation in a manner that a trajectory 6 of laser light and a trajectory 6' of different laser light that is used for irradiation adjacent to the laser run parallel as shown in FIG. 1.

Figure 2:
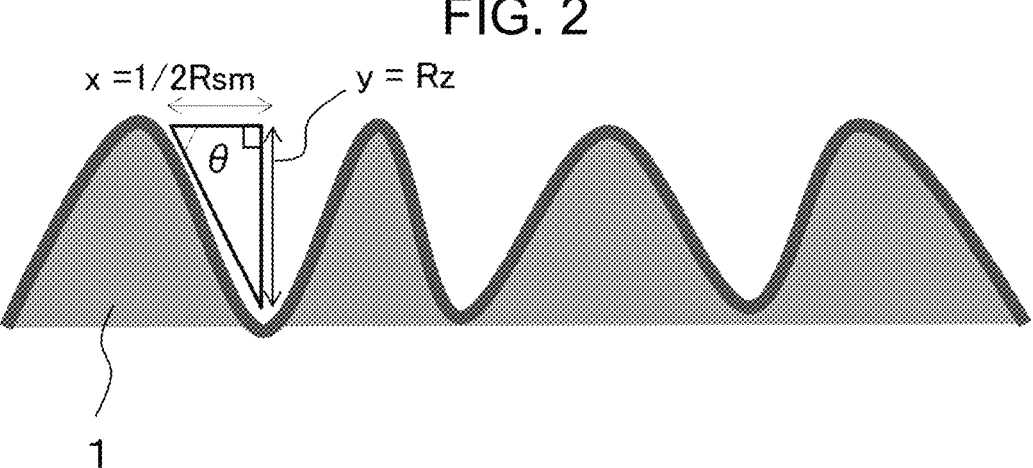
FIG. 2 is a pattern diagram for describing a situation where an x-axis component and a y-axis component of a recess part of a metal member are arranged with a maximum height roughness Rz and an average interval Rsm.

In detail, in a case where the shape of the recess part is approximated to a triangle as shown in FIG. 2, the angle formed by the bottom surface and an oblique side of the triangle becomes an angle θ. Specifically, the shape of the recess part can be approximated to a triangle having the vertex at the deepest point of the recess part, the bottom surface connecting the vicinities of the top parts of individual projection parts that are positioned on both sides of the recess part so as to be parallel to the surface of the metal base material and two oblique sides connecting the vertex and both end parts of the bottom surface. Furthermore, in a case where a perpendicular line segment is drawn from the vertex toward the bottom side in the height direction of the triangle, the triangle approximating the recess part can be bisected by this line segment. The angle θ represents the angle formed by the bottom surface and the oblique side of one of these triangles. When the recess part is separated into an x-axis component and a y-axis component as described above, Rz/(Rsm/2)=tan θ is satisfied, and a recess part to be formed can be arranged with the angle θ. That is, the element of the x-axis component of the recess part can be arranged using a result measured as the surface roughness Rsm, and the element of the y-axis component of the recess part can be arranged using a result measured as the surface roughness Rz.

(180/π)×arctan(Rz/(Rsm/2)) in the relational formula (1) represents the angle θ of the recess part as shown in FIG. 2. In a case where the angle θ is small, the angle of the vertex of the triangle approximating the recess part becomes large, and there is a tendency that the recess part has a shallow and gentle shape. In addition, in a case where the angle θ is large, the angle of the vertex of the triangle approximating the recess part becomes small, and there is a tendency that the recess part has a deep and sharp shape.

When the angle θ that is represented by the maximum height roughness Rz and the average interval Rsm is the lower limit value or more, the depth of the recess part becomes extremely small compared with the width of the opening part of the recess part, the recess part has a shallow shape, and it is possible to prevent the shape from becoming a shape in which the interaction between the metal member and a resin becomes weak even when the resin flows into the recess part. In addition, when the angle θ that is represented by the maximum height roughness Rz and the average interval Rsm is the upper limit value or less, the depth of the recess part becomes extremely large compared with the width of the opening part of the recess part, the recess part has an extremely thin shape that becomes sharply narrow in the depth direction, and it is possible to prevent the shape from becoming a shape in which it is difficult for a resin to flows into the deep part of the recess part. Therefore, the generation of voids that are generated between grooves and the resin due to the inflow of the resin into the deep part of the recess part is suppressed, and a chemical joint with the resin is retained even in the deep part of the recess part, whereby the airtightness is likely to improve. As described above, the use of the maximum height roughness Rz makes it possible to evaluate a decrease in the joint strength or the lack of airtightness, which may be caused due to the recess part, by evaluating the angle θ of the recess part having the deepest (sharpest) shape.

In addition, in the present invention, it is preferable that, in the direction orthogonal to the running direction of the plurality of marking patterns, an arithmetic average roughness Ra of the uneven parts and the average interval Rsm of the unevenness by the uneven parts further satisfy the following relational formula (2).

$$2.5 \leq Rsm/Ra \leq 9.5. \tag{2}$$

The maximum height roughness Rz in the previous relational formula (1) is a value intended to evaluate the maximum values of some parts since attention is paid to the difference between the maximum height and the maximum depth in the uneven part. In the case of performing evaluation with the maximum height roughness Rz alone, it is possible to evaluate the shapes of the highest projection part and the lowest projection part that are present in a range, but it is not possible to perform evaluation reflecting other uneven shapes. In contrast, the arithmetic surface roughness Ra is a value intended to evaluate the entire roughness, and it is thus possible to evaluate shapes including parts other than the highest projection part and the lowest projection part that are present in a range. Therefore, the use of the relational formula (2) including the maximum height roughness Rz and the arithmetic surface roughness Ra makes it possible to evaluate even a partial disadvantage in the uneven part. The arithmetic surface roughness Ra is also surface roughness that is measured according to JIS B 0601-2001.

While the arithmetic surface roughness Ra represents the magnitude of the unevenness by the uneven parts, the average length Rsm of the roughness profile elements represents the length (interval) of the unevenness by the uneven parts. That is, the element of the x-axis component of the unevenness can be arranged using a result measured as the surface roughness Rsm, and the element of the y-axis component of the unevenness can be arranged using a result measured as the arithmetic surface roughness Ra. In a case where Rsm/Ra is small, the interval of the unevenness is relatively small with respect to the magnitude of the unevenness, and there is a tendency that the unevenness is densely formed. Alternatively, in a case where Rsm/Ra is small, the magnitude of the unevenness is relatively large with respect to the interval of the unevenness, a change in the unevenness becomes large, and there is a tendency that recess parts having a long and thin shape are formed. In addition, in a case where Rsm/Ra is large, the interval of the unevenness is relatively large with respect to the magnitude of the unevenness, and there is a tendency that the unevenness is relatively roughly formed. In addition, in a case where Rsm/Ra is large, the magnitude of the unevenness is relatively small with respect to the interval of the unevenness, a change in the unevenness becomes small, and there is a tendency that recess parts having a shallow shape are formed.

Furthermore, in a case where a plurality of marking patterns is separately formed, whereby there is an unirradiated part in the metal member, there is a flat part attributed to the unirradiated part that is derived from the metal base material sandwiched by the uneven shapes of the marking patterns. In a case where a plurality of marking patterns is formed to be adjacent to each other, whereby no unirradiated parts remain in the metal member, the uneven parts by the marking patterns are repeatedly present, whereby there is a tendency that the arithmetic surface roughness Ra becomes large. In contrast, in a case where there is an unirradiated part, there is a tendency that the arithmetic surface roughness Ra becomes small due to the influence of the flat part that is included as well as the uneven parts. Therefore, in a case where there is an unirradiated part, there is a tendency that Rsm/Ra becomes large.

When Rsm/Ra is the lower limit value or more, the depth of the recess part becomes extremely large compared with the width of the opening part of the recess part, the recess part has an extremely thin shape that becomes sharply narrow in the depth direction, and it is possible to prevent the shape from becoming a shape in which it is difficult for a resin to flows into the deep part of the recess part and the airtightness is likely to deteriorate. In addition, when Rsm/Ra is the upper limit value or less, the depth of the recess part becomes extremely small compared with the width of the opening part of the recess part, the recess part has a shallow shape, and it is possible to prevent the shape from becoming a shape in which the interaction between the metal member and a resin becomes weak even when the resin flows into the recess part. Furthermore, when Rsm/Ra is the upper limit value or less, it is possible to prevent the separate formation of the uneven parts and the consequent formation of an untreated part where the metal base material is exposed between the uneven parts.

Figure 3:
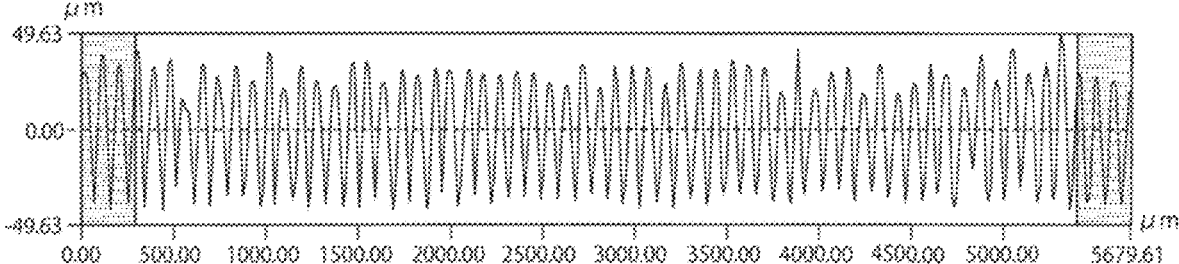
FIG. 3 is a roughness profile measured in a direction orthogonal to a running direction of a marking pattern regarding a metal member of Example 5.
Figure 4:
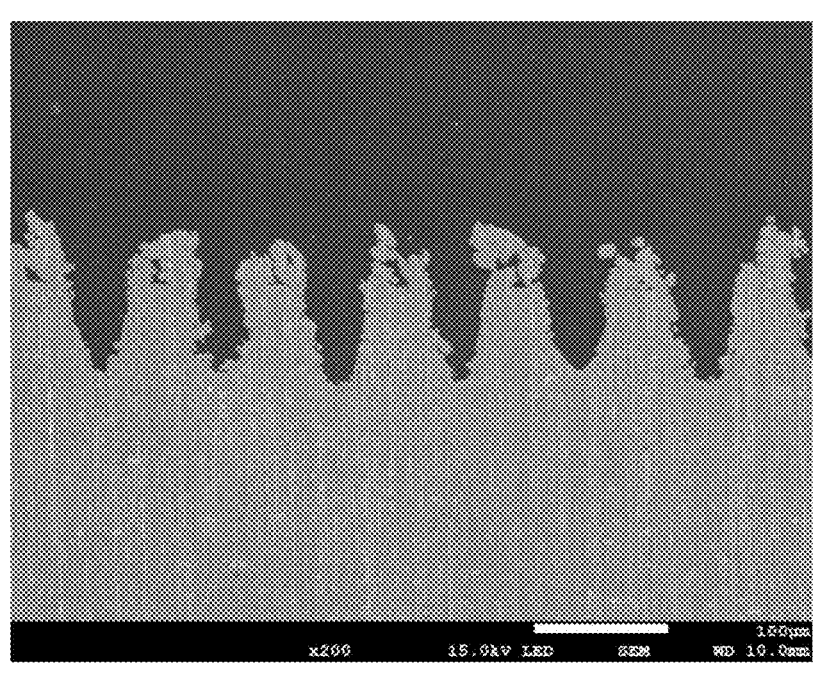
FIG. 4 is an observation result (×200) of a joint cross section with SEM of a metal-resin joined body obtained by joining a resin molded body to the metal member of Example 5.
Figure 5:
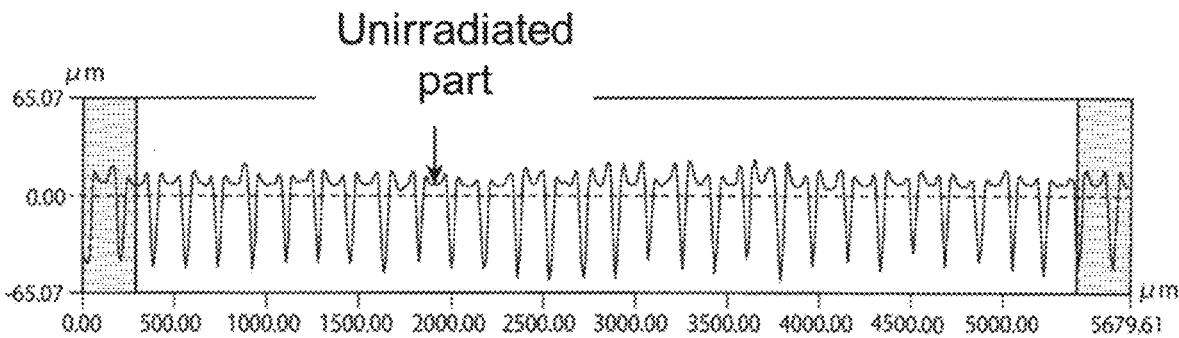
FIG. 5 is a roughness profile measured in a direction orthogonal to a running direction of a marking pattern regarding a metal member of Comparative Example 7.
Figure 6:
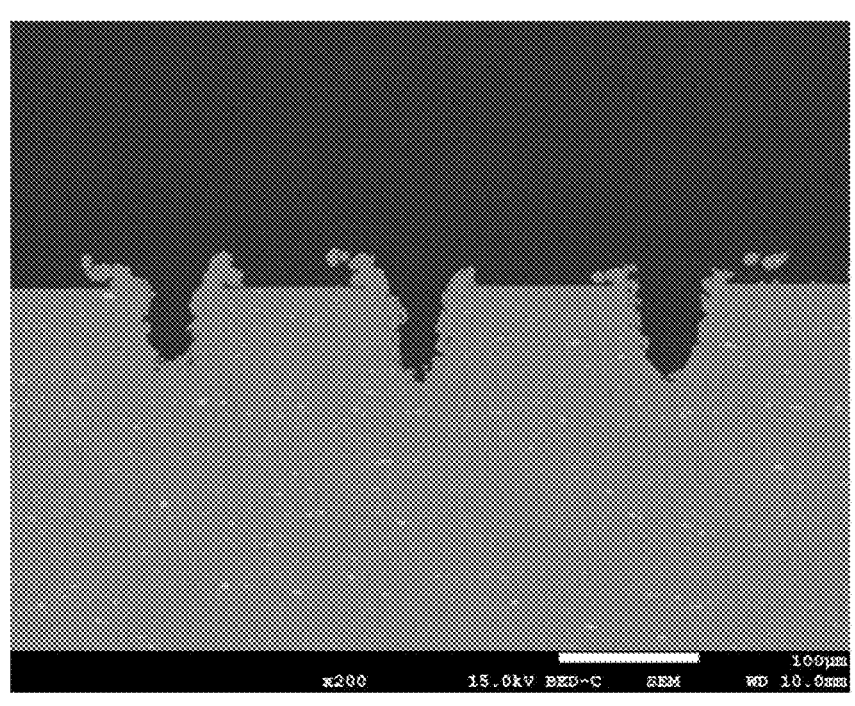
FIG. 6 is an observation result (×200) of a joint cross section with SEM of a metal-resin joined body obtained by joining a resin molded body to the metal member of Comparative Example 7.

Here, as an example, FIG. 3 shows the roughness profile of a metal member of Example 5, which will be described below, measured in a direction orthogonal to the running direction of marking patterns formed by irradiation with laser light. In addition, similarly, FIG. 5 shows the roughness profile of a metal member of Comparative Example 7. Between these, regarding the roughness profile of Example 5 shown in FIG. 3, FIG. 4 shows the observation result (×200) of a joint cross section with SEM of a metal-resin joined body obtained by actually joining a resin molded body to the metal member of Example 5. In addition, FIG. 6 shows the observation result (×200) of a joint cross section with SEM of a metal-resin joined body obtained by actually joining a resin molded body to the metal member of Comparative Example 7.

As is clear from the observation results of these joint cross sections, in both cases, uneven parts are provided that are each made up of a recess part formed in a recess shape in the depth direction from the surface in the central part of the marking pattern and a projection part formed in a projection shape in the height direction from the surface at the peripheral part of the marking pattern.

Between these, in the uneven parts of the metal member according to Comparative Example 7 (FIG. 6), untreated parts of the metal base material that are not irradiated with laser light are exposed between the recess parts adjacent to each other. In contrast, it is found that, in the uneven parts of the metal member according to Example 5 (FIG. 4), a metal derived from the metal base material that has dispersed from recess parts formed by irradiation with laser light and both adjacent recess parts on the right and left sides accumulates in the peripheries of the recess parts, and projection parts that are formed of the metal in the respective peripheries come into contact with each other and are integrated together. In other words, in the metal member of Example 3, untreated parts of the metal base material that are not irradiated with laser light are not formed.

In addition, according to the roughness profile of the metal member of Example 5 shown in FIG. 3, $(180/\pi) \times$ arctan (Rz/(Rsm/2)) in the relational formula (1) is 72 (that is, the angle $\theta = 72°$) and satisfies the relational formula (1) of the present invention. In addition, Rsm/Ra in the relational formula (2) is 2.6 and also satisfies this relational formula (2). On the other hand, in the roughness profile of the metal member of Comparative Example 7 shown in FIG. 5, $(180/\pi) \times$ arctan (Rz/(Rsm/2)) is 44 (that is, the angle $\theta = 44°$) and does not satisfy the relational formula (1) of the present invention. In addition, Rsm/Ra in the relational formula (2) is 9.7 and also does not satisfy this relational formula (2). Particularly, in the roughness profile of FIG. 5, the presence of a laser light-unirradiated part is indicated, and it is found that the detection of an unirradiated part becomes possible by the combination of the maximum height roughness Rz, the average interval Rsm and the arithmetic average roughness Ra.

In the present invention, the marking patterns on the metal member form the joint surface with a resin molded body and particularly specify the uneven parts in the direction orthogonal to the running direction of the plurality of marking patterns with the above-described relational formula (1) or (2). Therefore, it is difficult to determine each of the maximum height roughness Rz, the average interval Rsm and the arithmetic average roughness Ra, which configure these formulae, with a numerical range, and each is not particularly limited, but can be determined as described below based on the tendencies of uneven parts in a number of metal members obtained thus far and from the viewpoint of the joint strength with a resin molded body or airtightness. That is, the maximum height roughness Rz is preferably 50 µm or more and 250 µm or less. In addition, the average interval Rsm is preferably 60 µm or more and 400 µm or less. Furthermore, the arithmetic average roughness Ra is preferably 10 µm or more and 40 µm or less.

<Hydroxyl Group-Containing Film>

As described above, since the hydroxyl group-containing film containing a hydroxyl group is formed on the outermost surface of the metal molten layer in the marking pattern, it is preferable that the hydroxyl group-containing film is formed across the entire joint surface. In the present specification, "the entire joint surface" does not always refer to 100% of the surface area of the joint surface and does not exclude a case where surfaces not covered with the hydroxyl group-containing film are present as very small spots. The percentage of the joint surface covered with the hydroxyl group-containing film is preferably 90% or more and more preferably 95% or more.

The hydroxyl group-containing film can be confirmed by detecting a hydroxyl group that is present in the vicinity of the surface layer of the metal member by glow discharge optical emission spectrometry (GD-OES). Specifically, first, luminous intensities (V) derived from the main metal that configures the metal member and a hydroxyl group are measured in the thickness direction on the joint surface of the metal member using GD-OES. Subsequently, the detection amount of the main metal that configures the metal member is calculated from the integrated value (area) of the luminous intensities derived from the main metal. In addition, the detection amount of the hydroxyl group is calculated from the integrated value (area) of the luminous intensities derived from the hydroxyl group. Furthermore, the proportion of the detection amount of the hydroxyl group in the total amount of the detection amount of the main metal and the detection amount of the hydroxyl group is calculated as a hydroxyl group abundance rate. In the emission spectrum that is obtained by GD-OES, peaks that appear at 281 nm and 309 nm are regarded as peaks derived from the hydroxyl group. The luminous intensity in the vicinity of the surface layer of the metal member measured by GD-OES needs to be measured up to a depth of 200 nm from the surface. Specifically, a range from the detection of the luminous intensities derived from the main metal that configures the metal member and the hydroxyl group to the elapsing of a time necessary for sputtering at 200 nm, which corresponds to an element of the main metal is measured. This measurement range (time) can be ascertained by measuring the sputtering rate ($\mu m/min$) of a standard specimen containing the main metal element, which is the measurement subject, at a high purity in advance. The measurement of the luminous intensity using GD-OES makes it possible to detect and evaluate not only a component that is present in the outermost layer of the metal member but also a component that is capable of contributing to the joint with resins and is present at up to a certain depth.

The hydroxyl group abundance rate is preferably 4% or more, more preferably 5% or more, still more preferably 6% or more and particularly preferably 7% or more. When the hydroxyl group abundance rate is the above-described lower limit value or more, the number of hydroxyl groups that are present in the vicinity of the surface of the metal member increases, and the interaction with a functional group that is contained in the resin molded body becomes strong, whereby there is a tendency that the airtightness of the metal-resin joined body improves, and, at this time, there is a tendency that the joint strength of the metal-resin joined body also improves. The upper limit of the hydroxyl group abundance rate is not particularly limited, but is preferably 70% or less, more preferably 50% or less, still more preferably 40% or less and particularly preferably 30% or less. The hydroxyl group abundance rate varies with a method for forming the hydroxyl group. For example, in a case where a wet-type treatment such as a hydrated oxide treatment with warm water or hot water; a chemical conversion treatment; a zincate treatment is performed on the metal base material, the hydroxyl group abundance rate tends to become high compared with a case where a laser treatment is performed on the metal base material. In a case where the hydroxyl group-containing film is formed by a laser treatment, the hydroxyl group abundance rate is preferably 30% or less, more preferably 20% or less, still more preferably 15% or less and particularly preferably 10% or less.

The hydroxyl group-containing film contains, for example, a hydroxide (metal hydroxide) of the metal that configures the metal base material such as aluminum hydroxide ($Al(OH)_3$), aluminum hydroxide oxide ($AlO(OH)$), copper hydroxide ($Cu(OH)_2$), iron (II) hydroxide ($Fe(OH)_2$) or iron (III) hydroxide oxide ($FeO(OH)$) or an oxidized hydroxide (metal oxidized hydroxide) of the metal that configures the metal base material depending on the metal that configures the metal base material. In addition, the hydroxyl group-containing film may contain, for example, an oxide (metal oxide) of the metal that configures the metal base material such as aluminum oxide ($Al_2O_3$), copper (I) oxide ($Cu_2O$), copper (II) oxide ($CuO$), iron (II) oxide ($FeO$), iron (II, III) oxide ($Fe_3O_4$) or iron (III) oxide ($Fe_2O_3$) depending on the metal that configures the metal base material.

As described above, on the surface of the metal base material, the accumulated substance, which is the metal oxide that is formed by the laser irradiation and has accumulated in the periphery of the irradiated parts, is formed in a film shape. The metal molten layer composed of such an accumulated substance contains oxygen in the form of the metal oxide as described above. The metal molten layer has the hydroxyl group-containing film having a hydroxyl group in the outermost layer.

<Fine Uneven Part>

The metal member in the present invention includes the marking patterns having the uneven parts, and, macroscopically, the recess parts and the projection parts are alternately and continuously formed as described above. In addition, if such uneven parts formed by the laser irradiation are considered as "macro uneven parts," the macro uneven part can be considered to have a "fine uneven part" on the surface.

The fine uneven part is a structure having an uneven shape in the size of nanometer order and is formed on the macro uneven part on the surface of the hydroxyl group-containing film. The fine uneven part is formed on the surface of the hydroxyl group-containing film when the metal molten layer having the hydroxyl group-containing film has been formed by the laser irradiation. The fine uneven part can be confirmed by observing the surface or cross section of the metal member using, for example, a scanning electron microscope.

The fine uneven part has a fine opening part in the nanometer size of 10 nm to 50 nm and has a fine structure having a film thickness of 10 nm to 1000 nm. In the case of being observed with SEM, the fine uneven part is observed as a sponge-like structure having a fine opening part of the above-described size. The fine uneven part contains, similar to the hydroxyl group-containing film, a metal hydroxide or a metal oxidized hydroxide. In addition, the fine uneven part may contain, similar to the hydroxyl group-containing film, a metal oxide.

[1-2. Resin Molded Body]

Next, a resin molded body that is suitably used as the object to be joined with respect to the metal member having a predetermined joint surface will be described. The resin molded body can be formed by forming a resin composition on the surface of a metal member. The resin molded body contains a thermoplastic resin or a thermosetting resin.

The thermoplastic resin can be selected from well-known thermoplastic resins as appropriate depending on the use, examples thereof include polyamide-based resins (aliphatic polyamides such as PA6 and PA66 and aromatic polyamides), copolymers including a styrene unit such as polystyrene, ABS resins and AS resins, polyethylene, copolymers including an ethylene unit, polypropylene, copolymers including a propylene unit, other polyolefins, polyvinyl chloride, polyvinylidene chloride, polycarbonate-based resins, acrylic resins, methacrylic resins, polyester-based resins, polyacetal-based resins and polyphenylene sulfide-based resins, and one or more thereof can be used. Among these, polyamide-based resins and polyphenylene sulfide-based resins are preferably used since the resins are highly fluid at the time of molding the resins and easily enter the recess parts.

The thermosetting resin can be selected from well-known thermosetting resins as appropriate depending on the use, examples thereof include urea resins, melamine resins, phenolic resins, resorcinol resins, epoxy resins, polyurethane and vinyl urethane, and one or more thereof can be used. Among these, epoxy resins, acrylic resins and urethane resins are preferably used since reactive curing adhesives are highly compatible with the hydroxyl group-containing film and a higher joint strength can be obtained as the reaction area becomes larger.

In addition, for example, an adhesive can also be used as the resin molded body. As the adhesive, it is possible to use compounds containing the above-described thermoplastic resin or thermosetting resin or other elastomer or rubber and exhibiting adhesiveness. The adhesive can be selected from well-known adhesives as appropriate depending on the use, examples of dry solidifying adhesives include acrylic resin-based emulsion type, rubber-based latex type, vinyl acetate resin-based solvent type, vinyl copolymer resin-based solvent type, rubber-based solvent type and the like, examples of reactive curing adhesives include epoxy resin-based adhesives, urethane resin-based adhesives, modified silicone resin-based adhesives and the like, and one or more thereof can be used. Among these, epoxy resin-based adhesives, acrylic resin-based adhesives and urethane resin-based adhesives are preferably used since the reactive curing adhesives are highly compatible with the hydroxyl group-containing film and a higher joint strength can be obtained as the reaction area becomes larger.

Furthermore, a thermoplastic elastomer can be used, examples thereof include styrene-based elastomers, vinyl chloride-based elastomers, olefin-based elastomers, urethane-based elastomers, polyester-based elastomers, nitrile-based elastomers and polyamide-based elastomers, and one or more thereof can be used.

In addition, to each of the above-described resins (resin compositions), a fibrous, powdery, plate-like or other filler or a variety of elastomer components can be added to further improve performances such as adhesion to the metal member, mechanical strength, heat resistance, dimension stability (resistance to deformation, warpage and the like) and electrical properties.

Furthermore, to the resins (resin compositions), well-known additives that may be ordinarily added, that is, a flame retardant, a colorant such as a dye or a pigment, a stabilizer such as an antioxidant or an ultraviolet absorber, a plasticizer, a lubricant, a lubricant, a mold release agent, a crystallization promoter and a crystal nucleating agent can be added as appropriate to an extent that required performance or the objective of the present invention is not impaired.

[1-3. Metal-Resin Joined Body]

The metal-resin joined body is molded in a state where a resin has entered the joint surface (the macro uneven parts and the fine uneven parts) on the surface of the metal member, and the metal member and the resin molded body are integrally joined together through the joint surface. One metal member and one resin molded body may be joined together, a plurality of metal members and one resin molded body, one metal member and a plurality of resin molded bodies or a plurality of metal members and a plurality of resin molded bodies may be joined together, and, furthermore, a plurality of such sets may be laminated and joined together, which can be determined as appropriate depending on the use.

For example, the metal-resin joined body may be a metal-resin joined body in which the metal member and the resin molded body are joined together in a state of being laminated or continuously disposed. Alternatively, the metal-resin joined body may be a metal-resin-metal joined body in which the metal member, the resin molded body and the metal member are joined together in a state of being laminated or continuously disposed in this order. Alternatively, the metal-resin joined body may be a metal-resin-metal joined body in which the resin molded body, the metal member and the resin molded body are joined together in a state of being laminated or continuously disposed in this order.

In a case where the metal-resin joined body is a metal-resin-metal joined body in which two or more metal members are joined together through the resin molded body, the metal-resin joined body may include a resin molded body obtained by molding a thermoplastic resin or a thermosetting resin in a state of being sandwiched between the metal members. Alternatively, the metal-resin joined body may be a metal-resin joined body in which an adhesive containing a thermoplastic resin or a thermosetting resin is used as the resin molded body and the metal members are joined thereto through the adhesive.

[2. Method for Manufacturing Metal Member and Metal-Resin Joined Body]

A method for manufacturing a metal member of the present invention includes an irradiation step of irradiating a surface of a metal base material made of a metal with laser light to form a marking pattern having an uneven part that continues along the irradiation trajectory of the laser light on the surface of the metal base material, to obtain a metal member having a plurality of the marking patterns formed on the surface of the metal base material. A method for manufacturing a metal-resin joined body of the present invention includes a resin molding step of joining a resin molded body to the surface of a metal member.

[2-1. Method for Manufacturing Metal Member]

<Preparation Step>

In the method for manufacturing a metal member of the present invention, a preparation step of performing pretreatments such as a degreasing treatment, an etching treatment, a desmutting treatment, a chemical polishing treatment and an electrolytic polishing treatment as a pretreatment of the surface of the metal base material may be provided prior to the irradiation step.

<Irradiation Step>

In the present invention, a treatment of irradiating the surface of a metal base material made of a metal with laser light (hereinafter, simply referred to as "laser treatment" or the like) is performed. The laser treatment makes it possible to obtain the metal member according to the present invention by forming a joint surface with an object to be joined. Here, a well-known laser can be used as the laser, but a pulsed oscillation laser is convenient to process the metal base material in a spotted manner as in the present invention and is thus preferably used, and, for example, a YAG laser, a $YVO_4$ layer, a semiconductor laser or a fiber laser is preferably used.

The principle of forming a marking pattern having a predetermined uneven part on the metal base material by this laser treatment is generally as described below. That is, the metal base material melts, disperses and evaporates due to energy from the laser irradiation, and the metal base material is perforated due to evaporation, whereby a space acts as the base of a recess part, and parts on both sides (adjacent to both sides) of the recess part not irradiated with the laser act as the bases of projection parts. At the same time, the molten metal part is partially or fully oxidized to form a metal oxide, and this metal oxide accumulates in the periphery of the irradiated part, which becomes the recess part, whereby the projection parts are formed. An accumulated substance composed of the metal oxide formed on the surface of the metal base material as described above forms a metal molten layer that forms the uneven shape of the macro uneven part. Furthermore, the metal oxide is at least somewhat partially ionic, and, on the new surface of the metal oxide, a metal ion ($Al^{3+}$) and an oxide ion ($O^{2-}$) are present. Due to electrostatic neutralization, the metal oxide reacts with moisture in the air, whereby the metal oxide present on the surface of the metal molten layer turns into a hydroxyl group, and the surface of the metal molten layer is covered with the hydroxyl group. Macro uneven parts are formed on the metal base material as described above, and a hydroxyl group-containing film containing the hydroxyl group is formed on the outermost layer of the metal molten layer. When attention is paid to this hydroxyl group-containing film, macroscopically, the hydroxyl group-containing film has the macro uneven parts in which the recess parts and the projection parts that are alternately and continuously formed and fine uneven parts formed on the surfaces of the macro uneven parts.

In a case where there is a laser unirradiated part that is not irradiated with the laser on the metal base material, the metal molten layer is not present on the laser unirradiated part, and the hydroxyl group-containing film is also not present. Normally, an oxide film is formed on the laser unirradiated part. Since the laser unirradiated part has no hydroxyl group-containing films, improvement in the airtightness by a chemical joint attributed to the hydroxyl group does not occur. In addition, in a case where the laser unirradiated part is flat, improvement in the joint strength by mechanical joint attributed to the macro uneven parts cannot be found. Therefore, in a case where the laser unirradiated part remains on the joint surface and no hydroxyl group-containing films are formed on the entire joint surface, the airtightness and joint strength of the metal-resin joined body decrease.

Figure 7:
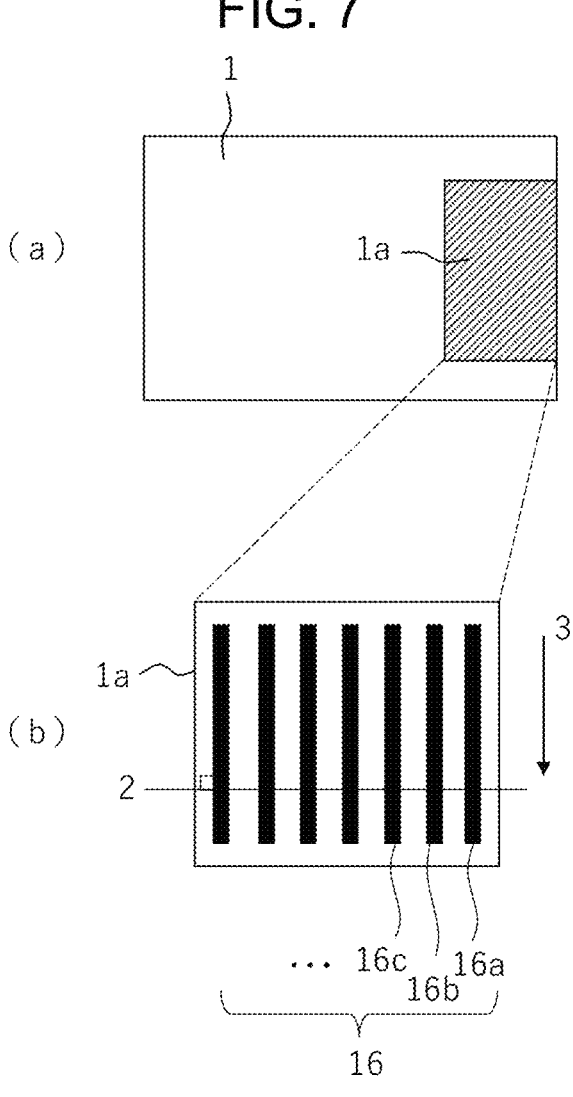
FIG. 7(*a*) shows a situation where a joint surface is formed at one end of a flat plate-like metal base material, and FIG. 7(*b*) shows an example (stripe pattern) of marking patterns on the joint surface.
Figure 8:
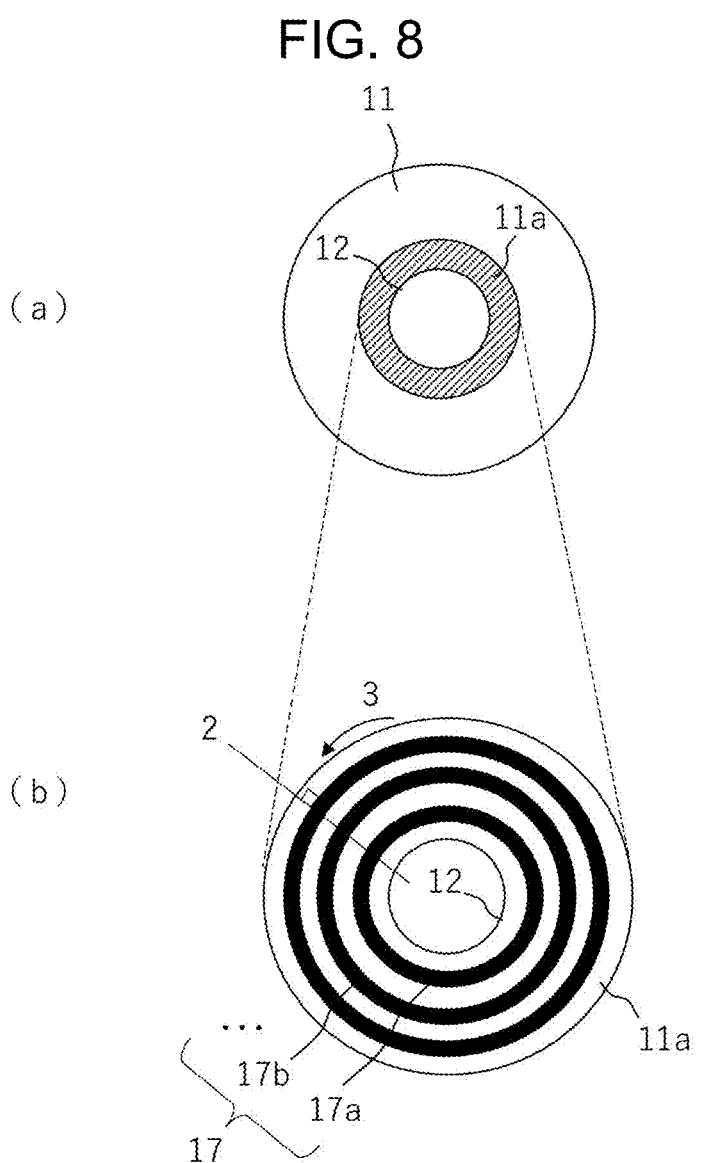
FIG. 8(*a*) shows a situation where a joint surface is formed to rim an opening part in a disc-like metal base material, and FIG. 8(*b*) shows an example (concentric circle pattern) of marking patterns on the joint surface.

In the present invention, upon forming a marking pattern having an uneven part that continues along the irradiation trajectory of the laser light on the surface of the metal base material, the marking pattern is made to be one continuous line. The marking pattern may be a straight line, may be a curved line or may be a combination of a straight line and a curved line. In addition, a plurality of marking patterns that is adjacent to each other and runs parallel is formed in the joint surface of the metal member by the irradiation of adjacent portions with the laser light. The shape of the marking pattern that is formed in the joint surface is not particularly limited, and the following marking pattern can be shown as one example. For example, FIG. 7(a) shows a situation where a joint surface 1a is formed at one end of a flat plate-like metal base material 1, and a plurality of linear marking patterns 16a, 16b, 16c and the like is drawn on this joint surface 1a to form a stripe pattern of marking pattern 16 as a whole as shown in FIG. 7(b). In addition, FIG. 8(a) shows a situation where a joint surface 11a is formed to rim an opening part 12 in a disc-like metal base material 11 having the opening part 12 in the center, and a plurality of circular marking patterns 17a, 17b and the like is drawn on this joint surface 11a to form a concentric circle pattern of marking pattern 17 as a whole as shown in FIG. 8(b). Here, in FIGS. 7 and 8, a scanning direction 3 of the marking pattern by the irradiation with the laser light and a direction 2 orthogonal to the irradiation trajectories of the plurality of marking patterns are each as shown in the drawings. In addition, it is needless to say that how to make each marking pattern run parallel or the shape, size or the like of each marking pattern is not limited thereto.

In addition, in the present invention, it is preferable that, in a region that is sandwiched by the marking patterns adjacent to each other, the projection parts that are included in the marking patterns adjacent to each other, respectively, are formed to be in contact with each other and integrated together. Particularly, it is preferable that an untreated part where the metal base material to be irradiated with the laser light is exposed is not present on the surface of the metal member.

<Laser Treatment Conditions>

In the present invention, it is preferable to set laser treatment conditions as described below in consideration of the following facts to form the above-described marking patterns having a predetermined uneven part.

The laser treatment is affected by the irradiation energy of the laser light per unit area (hereinafter, also referred to as "energy density"). The energy density represents laser output that a part to be irradiated with laser, which is to be irradiated with the laser light, receives per unit area and unit time in an object (work) that is an object of the laser treatment. The energy density (J/mm$^2$) is represented by the following equation (A1) using the output W (W) of the laser light, the number N (times) of times of laser light scanning, the irradiation interval C (mm) of the laser light, the scanning velocity V (mm/s) of the laser light, the length Length of the part to be irradiated with laser orthogonal to the irradiation direction of the laser light and the width Width of the part to be irradiated with laser parallel to the irradiation direction of the laser light.

$$\text{Energy density} = \qquad\qquad\qquad \text{Equation (A1)}$$
$$((\text{Length}/C) \times \text{Width} \times N)/V) \times W)/(\text{Length} \times \text{Width})$$

The following equation (A2) can be obtained by transforming the equation (A1). The energy density can be calculated with the equation (A2).

$$\text{Energy density} = (W \times N)/(C \times V) \qquad \text{Equation (A2)}$$

The energy density is preferably 0.5 J/mm$^2$ or more. When the energy density increases, marking patterns are generated on the surface of the metal base material on which the laser treatment has been performed, which makes it easy to form fine uneven parts having a hydroxyl group. In addition, it becomes easy to form a hydroxyl group-containing film having a predetermined hydroxyl group abundance rate. Furthermore, when the energy density increases, there is a tendency that recess parts in macro uneven parts that are formed on the surface of the metal base material are formed deep and the surface roughness of the metal member after the laser treatment becomes large. As the melting point of the metal that configures the metal base material becomes higher and heat dispersion becomes larger, there is a tendency that it becomes more difficult for the metal base material to receive the action of the laser light. In consideration of the above-described circumstance, the energy density is desirably changed in accordance with a metal that becomes the object of the laser treatment.

In a case where the laser treatment is performed on a metal base material containing aluminum as a main metal, the energy density is preferably 0.5 J/mm$^2$ or more, more preferably 1 J/mm$^2$ or more and still more preferably 1.5 J/mm$^2$ or more. In addition, in a case where the laser treatment is performed on a metal base material containing aluminum as a main metal, the energy density is preferably 5 J/mm$^2$ or less, more preferably 4 J/mm$^2$ or less and still more preferably 3 J/mm$^2$ or less.

In a case where the laser treatment is performed on a metal base material containing iron as a main metal, the energy density is preferably 1 J/mm$^2$ or more, more preferably 2 J/mm$^2$ or more and still more preferably 3 J/mm$^2$ or more. In addition, in a case where the laser treatment is performed on a metal base material containing iron as a main metal, the energy density is preferably 10 $J/mm^2$ or less, more preferably 8 $J/mm^2$ or less and still more preferably 6 $J/mm^2$ or less.

In a case where the laser treatment is performed on a metal base material containing copper as a main metal, the energy density is preferably 2 $J/mm^2$ or more, more preferably 4 $J/mm^2$ or more and still more preferably 6 $J/mm^2$ or more. In addition, in a case where the laser treatment is performed on a metal base material containing copper as a main metal, the energy density is preferably 20 $J/mm^2$ or less, more preferably 15 $J/mm^2$ or less and still more preferably 10 $J/mm^2$ or less.

When the energy density is the above-described lower limit value or more, marking patterns are drawn on the surface of the metal member on which the laser treatment has been performed, which makes it easy for fine uneven parts having a hydroxyl group to be formed. In addition, it becomes easy for a hydroxyl group-containing film having a predetermined hydroxyl group abundance rate to be formed. Therefore, the fine uneven parts having a hydroxyl group and the hydroxyl group-containing film make it easy for the airtightness and joint strength of the metal-resin joined body to improve. In addition, when the energy density is the above-described lower limit value or more, there is a tendency that the depth (L) of the recess part in the macro uneven part that is formed on the surface of the metal base material becomes large. Therefore, the resin molded body enters the macro uneven parts, whereby the mechanical joint (anchoring effect) between the macro uneven parts and the resin molded body is exhibited, which makes it easy for the joint strength to improve. When the energy density is the above-described upper limit value or less, it is possible to prevent the depth (L) of the recess part in the macro uneven part that is formed on the surface of the metal base material from becoming excessively large. Therefore, it is possible for the resin molded body to enter up to the deep parts of the recess parts in the macro uneven parts, and the chemical joint between the hydroxyl groups of the metal member and the functional groups of the resin molded body is exhibited in all of the macro uneven parts, which makes it easy for the airtightness to improve. In addition, the structure of the projection parts in the macro uneven parts is prevented from having a thin, long and sharp shape, whereby it is possible to suppress a decrease in the mechanical strength due to the break of the projection parts or the like. In addition, it is possible to prevent the occurrence of fracture in the metal member when the metal-resin joined body ruptures.

The laser conditions (laser treatment conditions) in the laser treatment need to be set as appropriate so as to achieve the above-described energy density. Examples of the parameters of the laser treatment conditions include the output W (W) of the laser light, the frequency (kHz) of the laser light, the beam diameter (μm) of the laser light, the irradiation interval (μm) of the laser light, the scanning velocity (mm/s) of the laser light, the number (times) of times of laser light scanning and the like. Here, the number of times of scanning refers to the number of times of repeatedly performing irradiation with the laser light along the same irradiation trajectory. In addition, the relationship between the beam diameter of the laser light and the irradiation interval will be described with reference to FIG. 1 shown above. The irradiation interval of the laser light refers to the interval between the trajectory 6 of one of the laser light used to irradiate the object and the trajectory 6' of the other laser light that is adjacent to the above-described laser light and used to irradiate the object. More specifically, the irradiation interval of the laser light refers to the distance between any one end part of the trajectory 6 of the one laser light orthogonal to the scanning direction 3 and the end part of the trajectory 6' of the other laser light that is on the same side as the one end part for the one laser light. In a case where a pulsed laser is used for the irradiation, the trajectory of the laser light is indicated as a trajectory in which pores that are formed by individual laser pulses continue. In this case, an irradiation interval 5 of the laser light corresponds to a length obtained by combining the width of a region sandwiched between the trajectories of the laser light that are formed of the continuous pores and the magnitude of a beam diameter 4.

Regarding cases where the main metal of the metal base material that is the object of the laser treatment is aluminum, iron and copper, examples of the laser treatment conditions are shown in Table 1.

TABLE 1

|  | Aluminum | Iron | Copper |
|---|---|---|---|
| Output (W) | 20-500 | 20-500 | 20-500 |
| Frequency (kHz) | 30-200 | 30-200 | 30-200 |
| Beam diameter (μm) | 20-200 | 20-200 | 20-200 |
| Irradiation interval (μm) | 20-200 | 20-200 | 20-200 |
| Scanning velocity (mm/s) | 200-5000 | 200-5000 | 200-5000 |
| Number of times of scanning (times) | 1-20 | 1-20 | 1-20 |
| Energy density (J/mm²) | 0.5-5 | 1-10 | 2-20 |

[2-2. Method for Manufacturing Metal-Resin Joined Body]

The metal-resin joined body is manufactured by molding a resin molded body on the surface of a metal member using a resin composition as a raw material.

Here, as a method for molding the resin composition (forming the resin molded body), a preferable molding method can be employed as appropriate in accordance with a resin to be used. For example, in a case where a thermoplastic resin is used, a method in which a metal-resin joined body is obtained by integrally joining a resin molded body by performing injection molding on a composition containing the thermoplastic resin on a metal member, alternatively, a method in which a resin molded body is obtained by injection molding in advance and the obtained resin molded body is integrally joined to the surface of a metal member by thermocompression bonding for which means such as laser welding, vibration welding, ultrasonic welding, hot press welding, hot plate welding, non-contact hot plate welding or high frequency welding is used or the like can be used, but the method is not limited thereto.

In addition, in a case where a thermosetting resin is used, a method in which a metal-resin joined body is obtained by integrally joining a resin molded body by performing injection molding on a composition containing the thermosetting resin on a metal member, alternatively, a method in which a composition adjusted to a predetermined viscosity is applied or the like onto a metal member and compression molding is then performed by integrally heating and pressurizing the composition and the metal member or the like can be used, but the method is not limited thereto.

In addition, in a case where an adhesive is used, the adhesive can be applied onto a metal member and dried to be cured, and an operation such as warming may be performed thereon as necessary. The molding conditions can be employed in accordance with the adhesive to be used.

[3. Action Effect]

Conventionally, it has been considered to be effective to form a structure in which a mechanical interaction is likely to occur by forming a macro uneven part having predetermined opening diameter and depth at the time of treating a metal material with laser light and thereby letting a resin enter the macro uneven part to increase the joint strength of a metal-resin joined body. In addition, it is known that a molten part of a metal base material that is generated by the laser treatment is an oxygen-containing film containing oxygen and this oxygen-containing film contributes to the development of the joint strength. As a result of detailed studies, the present inventors found that it is effective to control a recess part in a marking pattern having an uneven part that is formed by a laser treatment to a predetermined shape. That is, in the shape of the recess part in the marking pattern, when the angle θ that is represented by the maximum height roughness Rz and the average interval Rsm is within a predetermined range, the generation of voids that are generated between the recess part and the resin due to the inflow of the resin into the deep part of the recess part is suppressed, and the marking pattern has, in the cross-sectional shape, a recess part in which the surface area of the oxygen-containing film that acts with the resin increases and the interaction by the metal member and the resin is sufficiently exhibited, and the joint strength and the airtightness thus improve.

EXAMPLES

Hereinafter, a suitable embodiment of the present invention will be specifically described based on example, comparative examples and experimental examples, but the present invention should not be interpreted to be limited thereto.

[Evaluation Methods]

<Evaluation of Joint Cross Section>

A metal member before the joining of a resin molded body or a metal-resin joined body was cut in the thickness direction, embedded in an epoxy resin, and wet-type polishing was performed thereon, thereby producing a sample for joint cross section evaluation. Regarding the sample for joint cross section evaluation, a thickness-direction cross section was observed with a scanning electron microscope (manufactured by JEOL, Ltd., JSM-7200F) at a magnification of 100 to 500 times.

<Evaluation (1) of Joint Strength (Shear Test)>

Figure 9:
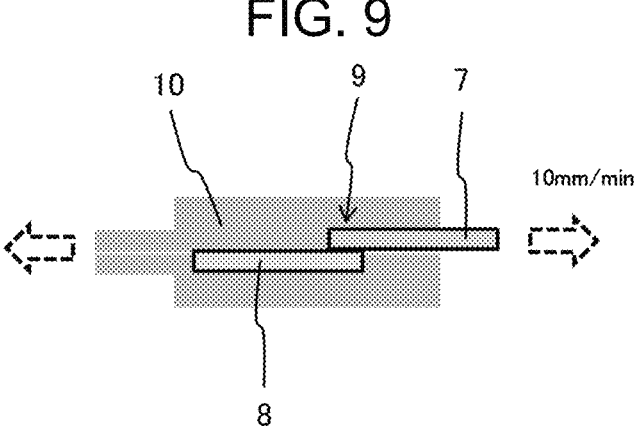
FIG. 9 is a view for describing the overview of a joint strength evaluation (1) (shear test).

The evaluation of the joint strength of the metal-resin joined body was performed by measuring the shear strength according to ISO 19095. Specifically, a test was performed by fixing a metal-resin joined body 9 obtained by joining a metal member 8 and a resin molded body 7 to an exclusive jig 10 and applying a load so that a shear force was applied in a direction parallel to the joint surface at a velocity of 10 mm/min as shown in FIG. 9 to fracture a joined part between the metal member and the resin molded body. A rupture force when the metal-resin joined body ruptured was obtained as a tensile shear strength (MPa).

Furthermore, the ruptured surface on the metal member side after the shear test was visually observed, and the rupture form was confirmed. In a case where base material fracture occurred in the resin molded body, the fracture was regarded as resin fracture and determined as O. On the other hand, in a case where interfacial fracture between the metal member and the resin molded body occurred, the fracture was regarded as interfacial fracture and determined as x.

<Evaluation (2) of Joint Strength (Shear Test)>

Figure 10:
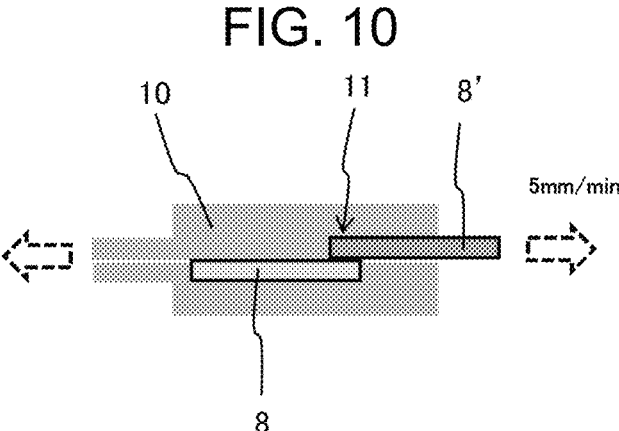
FIG. 10 is a view for describing the overview of a joint strength evaluation (2) (shear test).

The evaluation of the joint strength of the metal-resin joined body was performed by measuring the shear strength with reference to JIS K 6850. Specifically, a test was performed by fixing a metal-resin-metal joined body 11 obtained by pasting two metal members 8 and 8' using a thermosetting adhesive, which will be described below, to the exclusive jig 10 and applying a load so that a shear force was applied in a direction parallel to the joint surface at a velocity of 5 mm/min as shown in FIG. 10 to fracture a joined part of the joined body of the metal members through the adhesive. A rupture force when the metal-resin-metal joined body ruptured was obtained as a tensile shear strength (MPa).

Furthermore, the ruptured surface after the evaluation of the shear strength was visually observed, and the rupture form was confirmed. In a case where cohesive fracture occurred due to the adhesive and the adhesive remained in the entire joined part, the fracture was regarded as resin fracture and determined as O. In a case where interfacial fracture between the metal member and the adhesive occurred, the fracture was regarded as interfacial fracture and determined as x.

<Evaluation of Airtightness>

Figure 11:
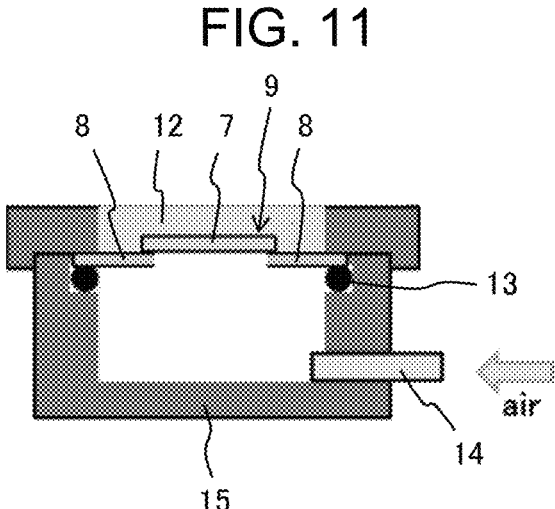
FIG. 11 is a view for describing the overview of the evaluation of the airtightness of a metal-resin joined body.
Figure 12:
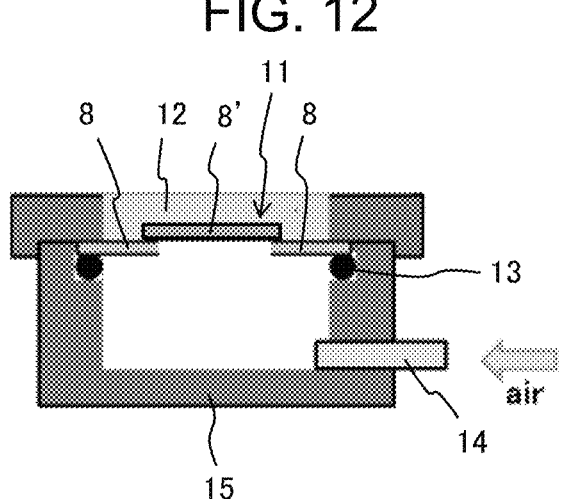
FIG. 12 is a view for describing the overview of the evaluation of the airtightness of a metal-resin-metal joined body.

The evaluation of the airtightness of the metal-resin joined body or the metal-resin-metal joined body was performed by an air leak test. Specifically, an air was applied at a positive pressure of up to a maximum of 0.5 MPa in a state where the metal-resin joined body 9 obtained by joining the metal member 8 and the resin molded body 7 was clamped to be fixed to the exclusive airtight jig 15 as shown in FIG. 11 and held for one minute and held for one minute. After that, the presence or absence of air leakage was visually confirmed. Alternatively, an air was applied at a positive pressure of up to a maximum of 0.5 MPa in a state where the metal-resin-metal joined body 11 obtained by pasting the two metal members 8 and 8' using the thermosetting adhesive, which will be described below, was clamped to be fixed to an exclusive airtight jig 15 as shown in FIG. 12. After that, the presence or absence of air leakage was visually confirmed. In the above-described exclusive airtight jig 15, the metal-resin joined body 9 or the metal-resin-metal joined body 11 was fixed by being vertically sandwiched with fixing jigs in a state where an O-ring 13 was interposed therebetween. Across the metal-resin joined body 9 or the metal-resin-metal joined body 11, water 12 was present in the open part in the upper side of the exclusive airtight jig 15, and an air was present in the sealed part in the lower side of the exclusive airtight jig 15. When an air is applied to the sealed part through a ventilation pipe 14, it is possible to confirm whether or not the air leaks toward the open part side through the metal-resin joined body 9 or the metal-resin-metal joined body 11 using whether or not air bubbles are generated from the joint interface as a mechanism. In a case where there was not air leakage within the evaluation time, the airtightness was regarded as pass and indicated by O, and, in a case where air leakage was confirmed, the airtightness was regarded as fail and indicated by x.

<Evaluation of Surface Roughness of Joint Surface>

As the surface roughness of the joint surface of the obtained metal member, the above-described maximum height roughness Rz, average integral Rsm and arithmetic average roughness Ra were measured using a one-shot 3D shape measuring instrument VR-3200 manufactured by Keyence Corporation. Regarding the measurement, 41 places within a measurement range of 3600×2800 μm were measured under conditions of a magnification of 80 times, no cut-off λs, no cut-off λc and a sampling length of 1, and the average value was calculated. At that time, the measurement was performed in a state where the stripe pattern trajectory of the laser light and stripe-like light that was radiated from a transmitter lens of the measuring instrument were made to have a positional relationship in which the trajectory and the light crossed at right angles. That is, regarding marking patterns formed by the irradiation of adjacent portions with the laser light, the maximum height roughness Rz of unevenness by the uneven parts, the average integral Rsm of unevenness by the uneven parts and the arithmetic average roughness Ra of the uneven parts were measured in a direction orthogonal to the irradiation trajectories of a plurality of marking patterns that was adjacent to each other and ran parallel. Specifically, in a metal member that formed a metal-resin joined body for joint strength evaluation made of an aluminum plate material or the like, which will be described below, as shown in FIG. 7(b), regarding a stipe pattern of the irradiation trajectory of laser light, 41 places in the above-described measurement range were measured in the direction 2 orthogonal to the irradiation trajectories, and the average value of individual surface roughness was calculated. In addition, in a metal member that formed a metal-resin joined body for airtightness evaluation made of an aluminum disc or the like, regarding a concentric circle pattern of the irradiation trajectory of laser light as shown in FIG. 8(b), similarly, 41 places were measured in the direction 2 orthogonal to the irradiation trajectory, and the average value of individual surface roughness was calculated.

Example 1

<Production of Metal Member>

A rectangular SUS plate material that was 1.5 mm in thickness, 18 mm in width and 45 mm in length was prepared from a stainless steel material (SUS304). In addition, a hole was opened in the SUS plate material to prepare an annular SUS disc that was 2 mm in thickness, 55 mm in outer diameter $\phi$ and 20 mm in inner diameter $\phi$. In addition, each was prepared as a metal base material.

Next, a laser treatment was performed on each of the SUS plate material and the SUS disc by irradiating the surface to be processed thereof with a laser under the following conditions, and a joint surface with a resin molded body was formed. Here, in the SUS plate material, as shown in FIG. 7, a rectangular region that was 10 mm in the longitudinal direction and 18 mm in the lateral direction at one end in the longitudinal direction of one main surface side was irradiated with a laser in a stripe pattern to produce a metal member for obtaining a metal-resin joined body for joint strength evaluation. In addition, in the SUS disc, as shown in FIG. 8, a 2.0 mm-wide annular region was irradiated with a laser concentrically from the inside to produce a metal member for obtaining a metal-resin joined body for airtightness evaluation. Laser treatment conditions therefore are summarized in Table 2 below.

<Laser Treatment Conditions>

Device: Manufactured by Keyence Corporation, 3Axis Fiber laser marker (model No.: MDF-5200, maximum output: 50 W)

Laser light wavelength: 1090 nm.

Transmission method: Pulse

Output: 85% (42.5 W)

Frequency: 60 kHz

Beam diameter: 60 μm

Irradiation interval: 90 μm

Scanning velocity: 340 mm/s

Number of times of scanning (number of times of irradiation): Once

<Joining of Resin Molded Body and Production of Metal-Resin Joined Body>

Figure 13:
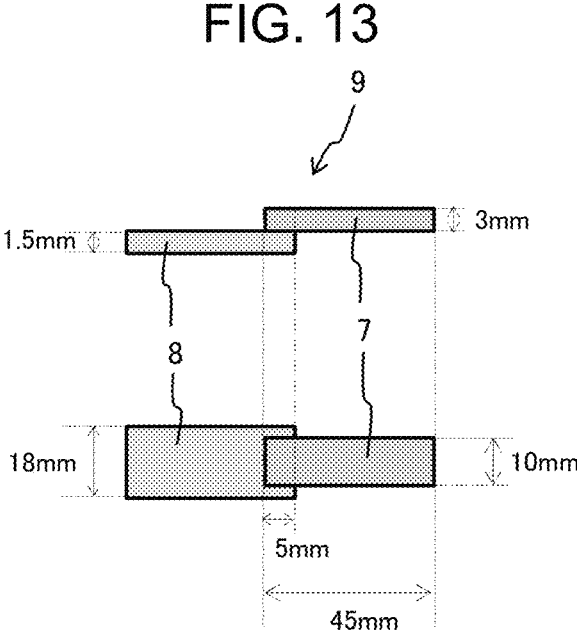
FIG. 13 is a view for showing the overview of the metal-resin joined body in the joint strength evaluation.
Figure 14:
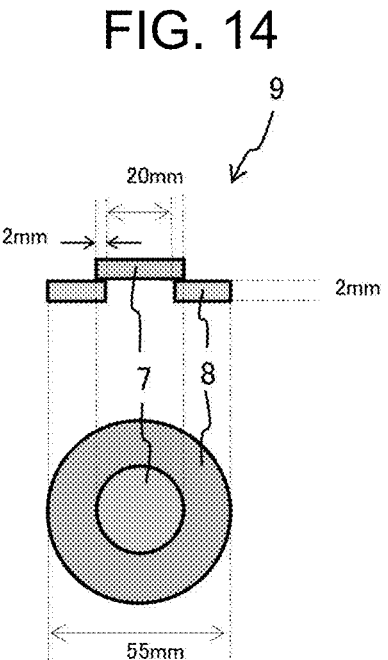
FIG. 14 is a view for showing the overview of the metal-resin joined body in the evaluation of airtightness.

Each of the metal members having a joint surface formed as described above (the SUS plate material and the SUS disc after the laser treatment) was inserted into a mold produced according to ISO 19095 using an injection molding machine (manufactured by Nissei Plastic Industrial Co., Ltd., FNX1103-18A), and injection molding was performed thereon using polyphenylene sulfide (PPS) (manufactured by Polyplastics Co., Ltd., trade name: DURAFIDE, grade: 1150MF1) as a thermoplastic resin at a resin temperature of 320 C, a mold temperature of 150 C, an injection velocity of 30 mm/s and a dwelling of 80 MPa. Therefore, a joined body of the SUS plate material (metal member) 8 and the resin molded body 7 (metal-resin joined body 9, FIG. 13) in which the resin molded body had a rectangular shape that was 3 mm in thickness, 10 mm in width and 45 mm in length and the joint area of the rectangular joint part between the SUS plate material and the resin molded body was 5 mm 10 mm was produced. In addition, a joined body of the SUS disc (metal member) 8 and the resin molded body 7 (metal-resin joined body 9, FIG. 14) in which the resin molded body had a disc shape that was 2 mm in thickness and 24 mm in diameter and the annular joint part with the inner diameter side surface of the SUS disc has a joint width of 2.0 mm and a joint area of 138.2 mm2 was produced. For both metal-resin joined bodies, the number of samples produced (N number) was three.

TABLE 2

| No. | Material | | Laser treatment conditions | | | | | |
| | Metal base material | Resin | Output [%] | Frequency [kHz] | Beam diameter [μm] | Scanning velocity [mm/s] | Irradiation interval [μm] | Number of times of scanning [times] |
| --- | --- | --- | --- | --- | --- | --- | --- | --- |
| Example 1 | SUS304 | PPS | 85 | 60 | 60 | 340 | 90 | 1 |
| Example 2 | SUS304 | PPS | 85 | 60 | 60 | 340 | 90 | 2 |
| Example 3 | SUS304 | PPS | 85 | 60 | 60 | 340 | 90 | 3 |
| Comparative Example 1 | SUS304 | PPS | 85 | 60 | 60 | 600 | 90 | 1 |
| Comparative Example 2 | SUS304 | PPS | 85 | 60 | 60 | 1000 | 90 | 1 |
| Comparative Example 3 | C1020 | PPS | 85 | 60 | 60 | 340 | 90 | 2 |
| Example 4 | C1020 | PPS | 85 | 60 | 60 | 340 | 90 | 5 |
| Example 5 | A5052-H34 | MXD10 | 85 | 60 | 60 | 340 | 90 | 1 |
| Example 6 | A5052-H34 | MXD10 | 60 | 60 | 60 | 340 | 90 | 1 |
| Comparative Example 4 | A5052-H34 | MXD10 | 30 | 60 | 60 | 340 | 90 | 1 |

TABLE 2-continued

| | | | | | Laser treatment conditions | | | |
| | Material | | | | Beam | Scanning | Irradiation | Number of times of |
| No. | Metal base material | Resin | Output [%] | Frequency [kHz] | diameter [µm] | velocity [mm/s] | interval [µm] | scanning [times] |
|---|---|---|---|---|---|---|---|---|
| Example 7 | A5052-H34 | MXD10 | 85 | 60 | 60 | 600 | 90 | 1 |
| Example 8 | A5052-H34 | MXD10 | 85 | 60 | 60 | 340 | 70 | 1 |
| Comparative Example 5 | A5052-H34 | MXD10 | 85 | 60 | 60 | 340 | 60 | 1 |
| Comparative Example 6 | A5052-H34 | MXD10 | 85 | 60 | 60 | 340 | 40 | 1 |
| Example 9 | A5052-H34 | MXD10 | 85 | 60 | 60 | 340 | 120 | 1 |
| Comparative Example 7 | A5052-H34 | MXD10 | 85 | 60 | 60 | 340 | 180 | 1 |
| Comparative Example 8 | A5052-H34 | MXD10 | 85 | 60 | 60 | 340 | 200 | 1 |
| Comparative Example 9 | A5052-H34 | MXD10 | 85 | 60 | 60 | 300 | 90 | 1 |
| Example 10 | A6063-T5 | SW2214 | 85 | 60 | 60 | 500 | 70 | 1 |

<Evaluation>

Regarding each metal member (the SUS plate material after the laser treatment) according to Example 1, the maximum height roughness Rz of unevenness by the uneven parts, the average integral Rsm of unevenness by the uneven parts and the arithmetic average roughness Ra of the uneven parts were measured by the above-described methods, and "$(180/\pi) \times \arctan(Rz/(Rsm/2))$" in the relational formula (1) (that is, "angle $\theta$") and "Rsm/Ra" in the relational formula (2) were obtained. These results are summarized in Table 3. On the plate member that was used for the evaluation of the joint strength and the disc that was used for the evaluation of the airtightness, the laser treatment was performed under the same laser treatment conditions. Therefore, the maximum height roughness Rz of unevenness by the uneven parts, the average integral Rsm of unevenness by the uneven parts and the arithmetic average roughness Ra of the uneven parts that were measured regarding the plate material, and the results of the evaluation of the joint cross section became the same results even in the disc.

In addition, on the metal-resin joined bodies obtained using these metal members, the evaluation of the joint cross section was performed. Furthermore, regarding the metal-resin joined body for joint strength evaluation, a test of fracturing the joint part between the SUS plate material (metal member) 8 and the resin molded body 7 was performed by the above-described evaluation (1) of the joint strength, and a rupture force when the metal-resin joined body ruptured was obtained as a tensile shear strength (MPa). At that time, the rupture form after the tensile shear test was visually observed. Furthermore, regarding the metal-resin joined body for airtightness evaluation, the presence or absence of air leakage was visually confirmed by the above-described evaluation of the airtightness. The results are shown in Table 3. In Table 3, in a case where at least any one of the joint state (rupture form) and the airtightness (air leakage) was determined as x, the metal-resin joined body is indicated by "x" as general determination. In addition, in a case where both were determined as ○, the metal-resin joined body is indicated by "○" as general determination.

TABLE 3

| No. | Ra [µm] | Rz [µm] | Rsm [µm] | Rz/(Rsm/2) | Θ [°] | Rsm/Ra | Shear strength [MPa] | Rupture form | Airtightness | General determination |
|---|---|---|---|---|---|---|---|---|---|---|
| Example 1 | 15 | 56 | 90 | 1.2 | 51 | 5.9 | 41 | ○ | ○ | ○ |
| Example 2 | 27 | 106 | 101 | 2.1 | 65 | 3.7 | 40 | ○ | ○ | ○ |
| Example 3 | 28 | 127 | 111 | 2.3 | 66 | 4.0 | 40 | ○ | ○ | ○ |
| Comparative Example 1 | 8 | 34 | 90 | 0.8 | 37 | 11.3 | 35 | x | ○ | x |
| Comparative Example 2 | 4 | 22 | 92 | 0.5 | 26 | 21.6 | 37 | x | ○ | x |
| Comparative Example 3 | 6 | 29 | 90 | 0.6 | 33 | 14.7 | 38 | x | ○ | x |
| Example 4 | 24 | 94 | 90 | 2.1 | 64 | 3.8 | 41 | ○ | ○ | ○ |
| Example 5 | 37 | 148 | 98 | 3.0 | 72 | 2.6 | 57 | ○ | ○ | ○ |
| Example 6 | 25 | 96 | 90 | 2.1 | 65 | 3.6 | 57 | ○ | ○ | ○ |
| Comparative Example 4 | 9 | 35 | 90 | 0.8 | 38 | 9.9 | 38 | x | x | x |
| Example 7 | 14 | 52 | 93 | 1.1 | 48 | 6.6 | 54 | ○ | ○ | ○ |
| Example 8 | 35 | 192 | 275 | 1.4 | 54 | 7.8 | 59 | ○ | ○ | ○ |
| Comparative Example 5 | 25 | 153 | 328 | 0.9 | 43 | 13.2 | 57 | x | x | x |
| Comparative Example 6 | 13 | 124 | 300 | 0.8 | 40 | 23.1 | 50 | x | x | x |
| Example 9 | 31 | 130 | 121 | 2.2 | 65 | 3.9 | 53 | ○ | ○ | ○ |
| Comparative Example 7 | 19 | 87 | 180 | 1.0 | 44 | 9.7 | 36 | x | x | x |
| Comparative Example 8 | 15 | 88 | 201 | 0.9 | 41 | 13.2 | 31 | x | x | x |
| Comparative Example 9 | 40 | 197 | 95 | 4.1 | 76 | 2.4 | 56 | ○ | x | x |
| Example 10 | 11 | 60 | 70 | 1.7 | 60 | 6.6 | 52 | ○ | ○ | ○ |

Examples 2 and 3 and Comparative Examples 1 and 2

Metal members (an SUS plate material and an SUS disc) were produced in the same manner as in Example 1 except that the laser treatment conditions were changed as shown in Table 2, and each metal-resin joined body for evaluation was produced.

Regarding each of the obtained metal members (the SUS plate material and the SUS disc after the laser treatment), the maximum height roughness Rz of unevenness by the uneven parts, the average integral Rsm of unevenness by the uneven parts and the arithmetic average roughness Ra of the uneven parts were measured in the same manner as in Example 1, and "$(180/\pi)\times\arctan(Rz/(Rsm/2))$" in the relational formula (1) (that is, "angle $\theta$") and "$Rsm/Ra$" in the relational formula (2) were obtained. These results are summarized in Table 3. In addition, on the metal-resin joined bodies obtained using these metal members, a test of fracturing the joint part between the SUS plate material (metal member) 8 and the resin molded body 7 was performed by the above-described evaluation (1) of the joint strength, and a rupture force when the metal-resin joined body ruptured was obtained as a tensile shear strength (MPa). In addition, the rupture form after the tensile shear test was visually observed. Furthermore, regarding the metal-resin joined body for airtightness evaluation, the presence or absence of air leakage was visually confirmed by the above-described evaluation of the airtightness. The results are, similar to Example 1, shown in Table 3.

Comparative Example 3 and Example 4

Metal members (a Cu plate material and a Cu disc) were produced in the same manner as in Example 1 except that a metal base material was prepared using a rolled material of oxygen-free copper (C1020) shown in JIS H 3100 and the laser treatment conditions were changed as shown in Table 2, and each metal-resin joined body for evaluation was produced.

Regarding each of the obtained metal members (the Cu plate material and the Cu disc after the laser treatment), the maximum height roughness Rz of unevenness by the uneven parts, the average integral Rsm of unevenness by the uneven parts and the arithmetic average roughness Ra of the uneven parts were measured in the same manner as in Example 1, and "$(180/\pi)\times\arctan(Rz/(Rsm/2))$" in the relational formula (1) (that is, "angle $\theta$") and "$Rsm/Ra$" in the relational formula (2) were obtained. These results are summarized in Table 3. In addition, on the metal-resin joined bodies obtained using these metal members, a test of fracturing the joint part between the Cu plate material (metal member) 8 and the resin molded body 7 was performed by the above-described evaluation (1) of the joint strength, and a rupture force when the metal-resin joined body ruptured was obtained as a tensile shear strength (MPa). In addition, the rupture form after the tensile shear test was visually observed. Furthermore, regarding the metal-resin joined body for airtightness evaluation, the presence or absence of air leakage was visually confirmed by the above-described evaluation of the airtightness. The results are, similar to Example 1, shown in Table 3.

Examples 5 to 9 and Comparative Examples 4 to 9

Metal members (an aluminum plate material and an aluminum disc) were produced in the same manner as in Example 1 except that a metal base material was prepared using an A5052 aluminum alloy (A5052-H34) treated by a temper symbol H34 shown in JIS H 0001 according to ISO 19095 and the laser treatment conditions were changed as shown in Table 2.

Regarding each of the metal members having a joint surface formed as described above (the aluminum plate material and the aluminum disc after the laser treatment), injection molding was performed thereon using aromatic nylon containing polyamide MXD10 as a base resin (manu-factured by Mitsubishi Engineering-Plastics Corporation, trade name: Reny (registered trade name), grade: XL1002U) as a thermoplastic resin under injection conditions of a resin temperature of 250° C., a mold temperature of 140° C., an injection velocity of 30 mm/s and a dwelling of 80 MPa to, similar to Example 1, produce a joined body of the alumi-num plate material (metal member) 8 and the resin molded body 7 (metal-resin joined body 9) in which the resin molded body had a rectangular shape that was 3 mm in thickness, 10 mm in width and 45 mm in length and the joint area of the rectangular joint part between the aluminum plate material and the resin molded body was 5 mm×10 mm and to produce a joined body of the aluminum disc (metal member) 8 and the resin molded body 7 (metal-resin joined body 9) in which the resin molded body had a disc shape that was 2 mm in thickness and 24 mm in diameter and the annular joint part with the inner diameter side surface of the aluminum disc has a joint width of 2.0 mm and a joint area of 138.2 mm$^2$.

Regarding each of the obtained metal members (the aluminum plate material and the aluminum disc after the laser treatment), the maximum height roughness Rz of unevenness by the uneven parts, the average integral Rsm of unevenness by the uneven parts and the arithmetic average roughness Ra of the uneven parts were measured in the same manner as in Example 1, and "$(180/\pi)\times\arctan(Rz/(Rsm/2))$" in the relational formula (1) (that is, "angle $\theta$") and "$Rsm/Ra$" in the relational formula (2) were obtained. These results are summarized in Table 3. In addition, on the metal-resin joined bodies obtained using these metal mem-bers, a test of fracturing the joint part between the aluminum plate material (metal member) 8 and the resin molded body 7 was performed by the above-described evaluation (1) of the joint strength, and a rupture force when the metal-resin joined body ruptured was obtained as a tensile shear strength (MPa). In addition, the rupture form after the tensile shear test was visually observed. Furthermore, regarding the metal-resin joined body for airtightness evaluation, the presence or absence of air leakage was visually confirmed by the above-described evaluation of the airtightness. The results are, similar to Example 1, shown in Table 3.

Example 10

From a hollow extrusion material of A6063 aluminum alloy (A6063-T5) treated by a temper symbol T5 shown in JIS H 0001, two aluminum plate materials having a rectan-gular shape that was 5 mm in thickness, 25 mm in width and 50 mm in length, an annular aluminum disc that was 2 mm in thickness, 55 mm in outer diameter and 20 mm in inner diameter and a circular aluminum disc that was 2 mm in thickness and 24 mm in outer diameter were each cut out and prepared as a metal base material.

Next, joint surfaces were formed by performing laser irradiation in the same manner as in Example 1 except that the conditions of the laser treatment were changed as shown in Table 2. In each of the two aluminum plate materials, a rectangular region that was 6 mm in the longitudinal direc-tion and 25 mm in the lateral direction at one end in the longitudinal direction of one main surface side was irradi-ated with a laser. The irradiated area of the joint surface was 180 mm$^2$. In addition, in the annular aluminum disc, a 2.0 mm-wide annular region from the inside was irradiated with a laser. In addition, in the circular aluminum disc, a 2.0 mm-wide annular region from the outer circumferential side was irradiated with a laser. The irradiated areas of the joint surfaces were 138 mm$^2$.

Figure 15:
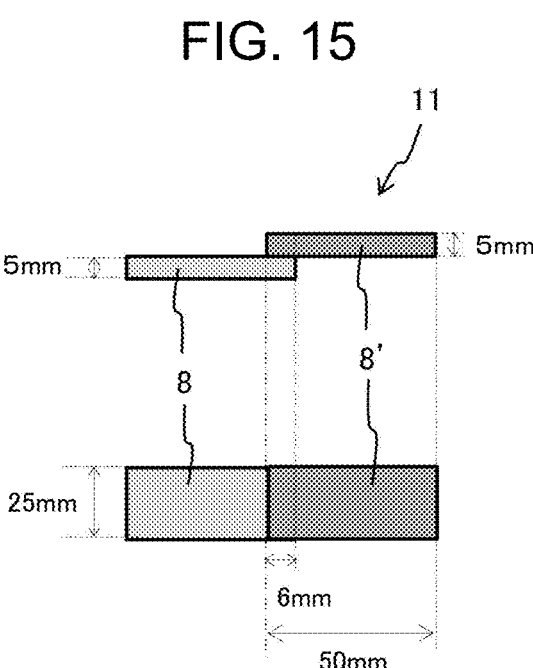
FIG. 15 is a view for showing the overview of a metal-resin-metal joined body in a joint strength evaluation according to Example 10.

Regarding each of the metal members having a joint surface formed as described above (the aluminum plate materials and the aluminum discs after the laser treatment), a thermosetting adhesive (one-component heat curing epoxy adhesive) (manufactured by 3M Japan Limited, trade name: SCOTCH-WELD (registered trade name) SW2214) was used as a resin and applied to the joint surface so that the thickness of the adhesive was adjusted to 0.2 mm with an SUS wire. After the application of the adhesive, the two aluminum plate materials were pasted together, a pressure of 0.01 MPa was applied thereto, and a joined body (a joined body of the aluminum plate material and the resin molded body) of the aluminum plate materials (metal members) 8 and 8' through the adhesive in which the joint area of the rectangular joint part between the two aluminum plate materials was 6 mm×25 mm (metal-resin-metal joined body 11, FIG. 15) was produced under a welding condition where the two aluminum plate materials and the adhesive were heated for 30 minutes after the test piece temperature reached 150° C. In addition, after the application of the adhesive, the annular aluminum disc and the circular aluminum disc were pasted together, and a joined body (a joined body of the annular aluminum disc and the circular aluminum disc) of the annular aluminum disc (metal member) 8 and the circular aluminum disc (metal member) 8' through the adhesive in which the annular joint part between the annular aluminum disc and the circular aluminum disc had a joint width of 2.0 mm and a joint area of 138.2 mm² (metal-resin-metal joined body 11, FIG. 16) was produced under the same welding condition.

Regarding each of the obtained metal members (the aluminum plate materials and the aluminum discs after the laser treatment), the maximum height roughness Rz of unevenness by the uneven parts, the average integral Rsm of unevenness by the uneven parts and the arithmetic average roughness Ra of the uneven parts were measured in the same manner as in Example 1, and "$(180/\pi)\times\arctan(Rz/(Rsm/2))$" in the relational formula (1) (that is, "angle $\theta$") and "Rsm/Ra" in the relational formula (2) were obtained. These results are summarized in Table 3. In addition, on the metal-resin joined bodies obtained using these metal members, a test of fracturing the joint part between the aluminum plate material (metal member) 8 and the resin molded body 7 was performed by the above-described evaluation (1) of the joint strength, and a rupture force when the metal-resin joined body ruptured was obtained as a tensile shear strength (MPa). In addition, the rupture form after the tensile shear test was visually observed. Furthermore, regarding the metal-resin joined body for airtightness evaluation, the presence or absence of air leakage was visually confirmed by the above-described evaluation of the airtightness. The results are, similar to Example 1, shown in Table 3.

[Study]

As shown in Table 3, in Comparative Examples 1 to 8 where the angle was less than the lower limit value of the relational formula (1), interfacial fracture was observed, and the joint strengths were determined as poor. Among these, in Comparative Examples 4 to 9, the airtightness was also evaluated as fail (x). In addition, in Comparative Example 9 where the angle was more than the upper limit value of the relational formula (1), there was no problem with the joint strength, but the airtightness was evaluated as fail.

Figures 16, 17:
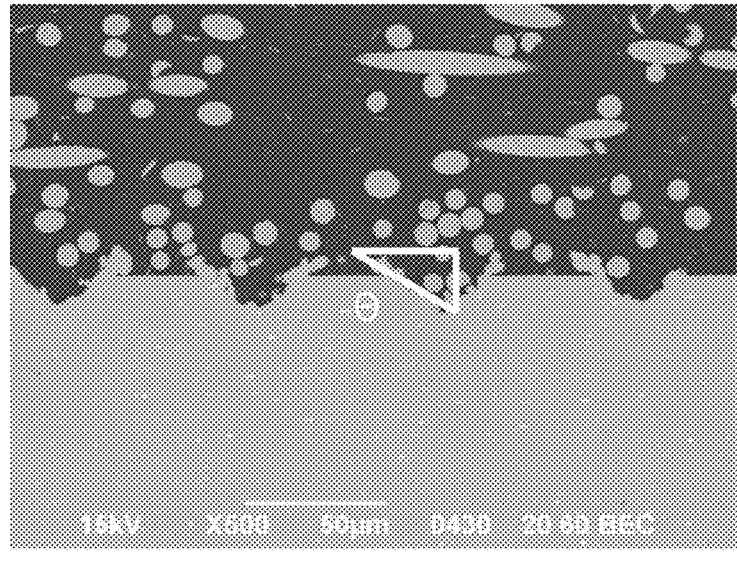
FIG. 16 is a view for showing the overview of the metal-resin-metal joined body in the evaluation of airtightness according to Example 10.
FIG. 17 is an observation result (×500) of a cross section with SEM of a metal-resin joined body obtained in Comparative Example 4.

Here, FIG. 17 shows an observation result (x 500) of a cross section with SEM of the metal-resin joined body obtained in Comparative Example 4. As a result of measuring the angle $\theta$ at the deepest point of each recess part and obtaining the average value regarding recess parts that were included in this cross-sectional SEM image, the angle $\theta$ at the recess part in the metal member obtained by the cross-sectional SEM observation was 43°. This angle shows a value close to an angle $\theta$ of 38° obtained from the relational formula (1) represented by the maximum height roughness Rz and the uneven parts, and it was backed that the angle $\theta$ of the recess part can be evaluated with Rz and Rsm. In addition, in Comparative Example 4, since the angle $\theta$ obtained from the relational formula (1) was less than the lower limit value, it is considered that even the recess part having the deepest shape formed a shape in which the recess part was shallow with respect to the width of the opening part and it became difficult for the resin to flow into the deep part of the recess part, whereby voids were generated and the airtightness deteriorated.

Figure 18:
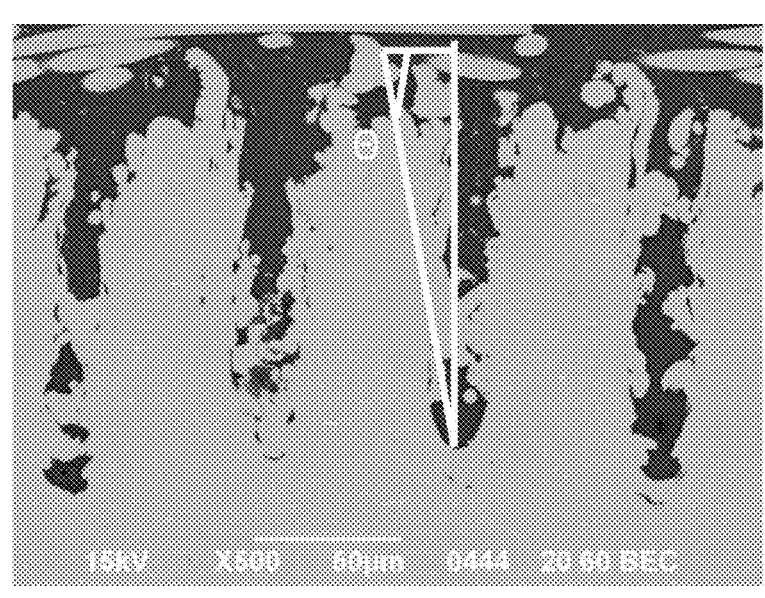
FIG. 18 is an observation result (×500) of a cross section with SEM of a metal-resin joined body obtained in Comparative Example 9.

In addition, FIG. 18 shows an observation result (×500) of a cross section with SEM of the metal-resin joined body obtained in Comparative Example 9. According to this, the angle $\theta$ at the recess part in the metal member obtained by the cross-sectional SEM observation was 80°. This angle shows a value close to an angle $\theta$ of 76° obtained from the relational formula (1), and it was backed that the angle $\theta$ of the recess part can be evaluated with Rz and Rsm. In addition, since the angle $\theta$ obtained from the relational formula (1) was more than the upper limit value, it is considered that even the recess part having the deepest shape formed a shape in which the recess part was deep with respect to the width of the opening part and it became difficult for the resin to flow into the deep part of the recess part, whereby voids were generated and the airtightness deteriorated.

Furthermore, in Comparative Example 4, there were laser unirradiated parts (untreated parts) as shown in FIG. 17. It is considered that, in Comparative Example 4, the airtightness and the joint strength decreased due to the influence of the laser unirradiated parts. In addition, it was backed from this result that, in a case where Rsm/Ra that is obtained from the relational formula (2) represented by the arithmetic average roughness Ra of the uneven parts and the average integral Rsm of unevenness by the uneven parts is more than the upper limit value, it is possible to evaluate that there is an unirradiated part on the surface of the metal member. In addition, in Comparative Example 4, the recess part had a shallow and gentle shape as shown in FIG. 17, and, in Comparative Example 9, the recess part had a deep, thin and long shape as shown in FIG. 18. It was backed from these results that the shape of the recess part can be evaluated with Rsm/Ra that is obtained from the relational formula (2).

Figure 19:
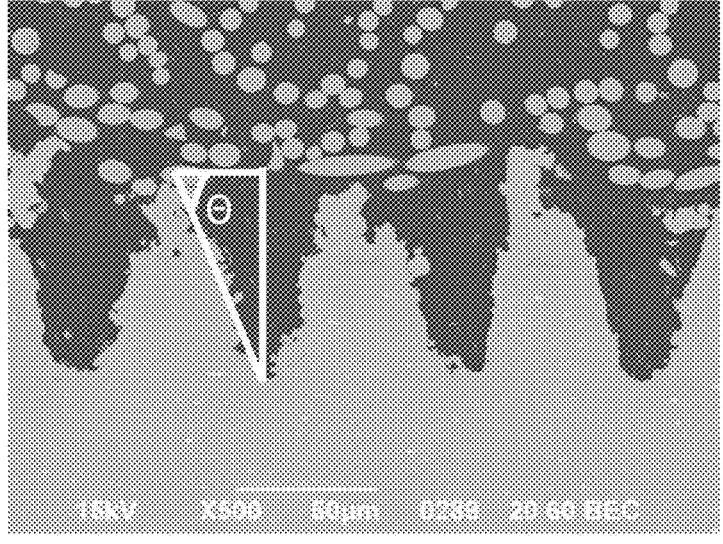
FIG. 19 is an observation result (×500) of a cross section with SEM of a metal-resin joined body obtained in Example 5.

In all of Examples 1 to 10 where the relational formula (1) was satisfied, favorable results were shown regarding both the joint strength and the airtightness. Among these, FIG. 19 shows an observation result (×500) of a cross section with SEM of the metal-resin joined body obtained in Example 5. According to this, the angle $\theta$ at the recess part in the metal member obtained by the cross-sectional SEM observation was 66°. This angle shows a value close to an angle $\theta$ of 72° obtained from the relational formula (1), and it was backed that the angle $\theta$ of the recess part can be evaluated with Rz and Rsm. In addition, it can be considered that, when the angle $\theta$ obtained from the relational formula (1) satisfies a predetermined range, the recess part having the deepest shape has a depth that is neither excessively small nor large compared with the opening, the interaction between the metal member and the resin is sufficiently exhibited, and a metal-resin joined body having an excellent joint strength and, furthermore, excellent airtightness can be obtained. Furthermore, in Example 5, as shown in FIG. 19, even a situation where the projection parts that were included in the marking patterns adjacent to each other, respectively, were formed to be in contact with each other and integrated together, and an untreated part where the metal base material was exposed was not found. It can be considered from these facts that, in the metal-resin joined bodies according to the examples, Rsm/Ra that was obtained from the relational formula (2) was less than the upper limit value, whereby the untreated part was not formed in the shape.

REFERENCE SIGNS LIST

1 . . . Metal base material, 2 . . . Direction orthogonal to marking pattern irradiation trajectory (running direction), 3 . . . Scanning direction, 4 . . . Beam diameter, 5 . . . Irradiation interval, 6 (6') . . . Trajectory of laser light, 7 . . . Resin molded body, 8 (8') . . . Metal member, 9 . . . . Metal-resin joined body, 10 . . . Exclusive jig for shear test, 11 . . . Metal-resin-metal joined body, 12 . . . Water, 13 . . . O-ring, 14 . . . Pipe for air blowing, 15 . . . Exclusive airtight jig, 16, 17 . . . Marking pattern

The invention claimed is:

1. A metal member comprising:

a metal base material made of a metal; and a marking pattern having an uneven part formed on a surface of the metal base material, wherein the marking pattern is one continuous straight line or curved line, a plurality of the marking patterns is formed to be adjacent to each other and run parallel, and, in a direction orthogonal to a running direction of the plurality of marking patterns, a maximum height roughness Rz of unevenness of the uneven parts and an average interval Rsm of the unevenness by the uneven parts have a relationship of $45 \leq (180/\pi) \times \arctan (Rz/(Rsm/2)) \leq 75$.

2. The metal member according to claim 1, wherein, in the direction orthogonal to the running direction of the plurality of marking patterns, an arithmetic average roughness Ra of the uneven parts and the average interval Rsm of the unevenness by the uneven parts have a relationship of $2.5 \leq Rsm/Ra \leq 9.5$.

3. The metal member according to claim 1, wherein, on the surface of the metal base material, the uneven part is formed that is made up of a recess part that is formed in a recess shape in a depth direction from the surface in a central part of the marking pattern and a projection part that is formed in a projection shape in a height direction from the surface at a peripheral part of the marking pattern, and on the surface of the metal base material, in a region that is sandwiched by the marking patterns adjacent to each other, the projection parts that are included in the marking patterns adjacent to each other, respectively, are formed to be in contact with each other and integrated together, and an untreated part where the metal base material is exposed is not formed.

4. The metal member according to claim 1, wherein the metal is aluminum, copper, iron or an alloy containing each of these metals.

5. A metal-resin joined body comprising:

the metal member according to claim 1; and a resin molded body formed on the surface of the metal member, wherein the metal member and the resin molded body are joined together in a state where a resin has entered the uneven parts of the marking patterns.

6. The metal-resin joined body according to claim 5, wherein the resin molded body contains a thermoplastic resin or a thermosetting resin.

7. A method for manufacturing a metal member, comprising:

an irradiation step of irradiating a surface of a metal base material made of a metal with laser light to form a marking pattern having an uneven part that continues along an irradiation trajectory of the laser light on the surface of the metal base material, to manufacture a metal member having a plurality of the marking patterns formed on the surface of the metal base material, wherein the marking pattern is one continuous straight line or curved line, in the irradiation step, the plurality of marking patterns that is adjacent to each other and runs parallel is formed by irradiation of adjacent portions with the laser light, and, in a direction orthogonal to the irradiation trajectories of the plurality of marking patterns, a maximum height roughness Rz of unevenness of the uneven parts and an average interval Rsm of the unevenness by the uneven parts have a relationship of $45 \leq (180/\pi) \times \arctan (Rz/(Rsm/2)) \leq 75$.

8. The method for manufacturing a metal member according to claim 7, wherein, in a direction orthogonal to a running direction of the plurality of marking patterns, an arithmetic average roughness Ra of the uneven parts and the average interval Rsm of the unevenness by the uneven parts have a relationship of $2.5 \leq Rsm/Ra \leq 9.5$.

9. The method for manufacturing a metal member according to claim 7, wherein, on the surface of the metal base material, the uneven part is formed that is made up of a recess part that is formed by dispersion of the metal in a place irradiated with the laser light outward from an irradiation central part of the laser light and a projection part that is formed by accumulation of the metal that has dispersed from the recess part in a periphery of the recess part, and on the surface of the metal base material, in a region that is sandwiched by the marking patterns adjacent to each other, the projection parts that are included in the marking patterns adjacent to each other, respectively, are formed to be in contact with each other and integrated together, and an untreated part where the metal base material that is to be irradiated with the laser light is exposed is not formed.

10. The method for manufacturing a metal member according to claim 7, wherein the metal is aluminum, copper, iron or an alloy containing each of these metals.

11. A method for manufacturing a metal-resin joined body, comprising:

a resin molding step of forming a resin molded body on the surface of the metal member obtained by the manufacturing method according to claim 7, to manufacture a metal-resin joined body having the metal base material and the resin molded body joined together, wherein, in the resin molding step, the metal member and the resin molded body are joined together in a state where a resin has entered the uneven parts of the marking patterns.

12. The method for manufacturing a metal-resin joined body according to claim 11, wherein, in the resin molding step, molding on the metal member is performed by using a resin composition containing a thermoplastic resin or a thermosetting resin.

13. The metal member according to claim 1, wherein the maximum height roughness Rz of the unevenness of the uneven parts is 50 μm or more and 250 μm or less, and the average interval Rsm of the unevenness by the uneven parts is 60 μm or more and 400 μm or less.

14. The method for manufacturing a metal member according to claim 7, wherein the maximum height roughness Rz of the unevenness of the uneven parts is 50 μm or more and 250 μm or less, and the average interval Rsm of the unevenness by the uneven parts is 60 μm or more and 400 μm or less.

\* \* \* \* \*